US 8,278,376 B2

(12) United States Patent
Qiu et al.

(10) Patent No.: US 8,278,376 B2
(45) Date of Patent: *Oct. 2, 2012

(54) FLAME-RETARDANT POLY(ARYLENE ETHER) COMPOSITION AND ITS USE AS A COVERING FOR COATED WIRE

(75) Inventors: Weili Qiu, Shanghai (CN); Jian Guo, Shanghai (CN); Xiucuo Li, Shanghai (CN); Hua Guo, Selkirk, NY (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/673,875

(22) PCT Filed: Sep. 5, 2008

(86) PCT No.: PCT/US2008/075335
§ 371 (c)(1),
(2), (4) Date: Feb. 3, 2011

(87) PCT Pub. No.: WO2009/042369
PCT Pub. Date: Apr. 2, 2009

(65) Prior Publication Data
US 2011/0266024 A1      Nov. 3, 2011

(51) Int. Cl.
*C08K 5/5313* (2006.01)
(52) U.S. Cl. .......... 524/126; 524/99; 524/100; 524/117; 524/133; 524/140; 524/141
(58) Field of Classification Search .............. 524/126, 524/133, 99, 100, 117, 140, 141
See application file for complete search history.

(56) References Cited

U.S. PATENT DOCUMENTS

| | | | |
|---|---|---|---|
| 5,258,455 A | 11/1993 | Laughner et al. | |
| 6,025,419 A | 2/2000 | Kasowski et al. | |
| 6,207,736 B1 | 3/2001 | Nass et al. | |
| 6,255,371 B1 | 7/2001 | Schlosser et al. | |
| 6,300,417 B1 | 10/2001 | Sue et al. | |
| 6,423,779 B2 | 7/2002 | Sue et al. | |
| 6,433,045 B1 | 8/2002 | Hanabusa et al. | |
| 6,547,992 B1 | 4/2003 | Schlosser et al. | |
| 6,855,767 B2 | 2/2005 | Adedeji et al. | |
| 7,148,276 B2 | 12/2006 | Bauer et al. | |
| 7,211,639 B2 | 5/2007 | Yeager et al. | |
| 7,589,281 B2 * | 9/2009 | Qiu et al. ............. | 174/110 R |
| 7,622,522 B2 | 11/2009 | Qiu et al. | |
| 7,655,714 B2 | 2/2010 | Qiu et al. | |
| 7,776,441 B2 | 8/2010 | Mhetar et al. | |
| 2004/0049063 A1 | 3/2004 | Hoerold et al. | |
| 2005/0009941 A1 | 1/2005 | Sicken et al. | |
| 2005/0011401 A1 | 1/2005 | Bauer et al. | |
| 2005/0014875 A1 | 1/2005 | Knop et al. | |
| 2005/0075427 A1 | 4/2005 | Campbell et al. | |
| 2005/0075472 A1 | 4/2005 | Yeager et al. | |
| 2005/0137297 A1 | 6/2005 | De Wit | |
| 2005/0170238 A1 | 8/2005 | Abu-Isa et al. | |
| 2005/0250885 A1 | 11/2005 | Mercx et al. | |
| 2005/0285086 A1 | 12/2005 | Kosaka et al. | |
| 2005/0288402 A1 | 12/2005 | Kosaka et al. | |
| 2006/0058432 A1 | 3/2006 | Perego et al. | |
| 2006/0074157 A1 | 4/2006 | Bauer et al. | |
| 2006/0106139 A1 | 5/2006 | Kosaka et al. | |
| 2006/0111548 A1 | 5/2006 | Elkovitch et al. | |
| 2006/0111549 A1 | 5/2006 | Elkovitch et al. | |
| 2006/0131052 A1 | 6/2006 | Mhetar et al. | |
| 2006/0135661 A1 | 6/2006 | Mhetar et al. | |
| 2006/0182967 A1 | 8/2006 | Kosaka et al. | |
| 2007/0244231 A1 | 10/2007 | Borade et al. | |
| 2007/0261878 A1 | 11/2007 | Kosaka et al. | |
| 2007/0295525 A1 | 12/2007 | Chiruvella et al. | |

FOREIGN PATENT DOCUMENTS

WO       98/08898        3/1998
WO       2006065540 A1   6/2006

OTHER PUBLICATIONS

PCT/US2008075335 European Search Report, dated Jul. 13, 2011, 5 pages.
ASTM D 638-03, "Standard Test Method for Tensile Properties of Plastics" 15 pages.
ASTM D 790-03, Standard Test Methods for Flexural Properties of Unreinforced and Reinforced Plastics and Electrical Insulating Materials, 11 pages.
U.S. Appl. No. 11/733,269, filed Apr. 10, 2007, "Water-Resistant Wire Coil, Wire Winding, and Motor, and Method of Increasing Motor Power", 42 pages.
International Searching Authority, The International Search Report and the Written Opinion of the International Searching Authority, PCT/US2008/075335, International Filing Date Sep. 5, 2008, Mailing Date Mar. 30, 2009 (12 pages).

* cited by examiner

*Primary Examiner* — Peter Szekely
(74) *Attorney, Agent, or Firm* — Cantor Colburn LLP

(57) ABSTRACT

A flame retardant poly(arylene ether) composition is described. In addition to the poly(arylene ether), the composition includes a polyolefin component, and a flame retardant composition that includes a metal dialkyl phosphinate. The polyolefin component can be a polyolefin polymer and/or the polyolefin block of a poly(alkenyl aromatic)-polyolefin block copolymer. The composition is particularly suitable as a replacement for poly(vinyl chloride) in insulation for wire and cable.

32 Claims, No Drawings

FLAME-RETARDANT POLY(ARYLENE ETHER) COMPOSITION AND ITS USE AS A COVERING FOR COATED WIRE

This is a U.S. national stage of International Application No. PCT/US2008/0075335, filed on 5 Sep. 2008, which is incorporated herein by reference and which is a continuation of U.S. application Ser. Nos. 11/862,478 filed 27 Sep. 2007 and issued as U.S. Pat. No. 7,622,522, 11/862,573 filed 27 Sep. 2007and issued as U.S. Pat. No. 7,655,714, and 11/862, 588 filed 27 Sep. 2007and issued as U.S. Pat. No. 7,655,714, and 11/862,588 fild 27 Sep. 2007 and issued as U.S. Pat. No. 7,589,281, the disclosures of which are also incorporated herein by reference.

BACKGROUND OF THE INVENTION

Poly(arylene ether) resin is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer products, for example, plumbing fixtures, electrical boxes, automotive parts, and insulation for wire and cable.

Poly(vinyl chloride) is currently the commercial dominant material for flame retardant wire and cable insulation. However, poly(vinyl chloride) is a halogenated material. There is mounting concern over the environmental impact of halogenated materials, and non-halogenated alternatives are being sought. There is therefore a strong desire—and in some places a legislative mandate—to replace poly(vinyl chloride) with non-halogenated polymer compositions.

Recent research has demonstrated that certain halogen-free poly(arylene ether) compositions can possess the physical and flame retardant properties needed for use as wire and cable insulation. See, for example, U.S. Patent Application Publication Nos. US 2006/0106139 A1 and US 2006/0182967 A1 of Kosaka et al. The compositions disclosed in these references can exhibit good flame retardancy and good physical properties such as flexibility and tensile strength. However, in some instances trade-offs in physical properties accompany the relatively large amounts of flame retardants required. For example, when the flame retardant composition comprises substantial amounts of a metal hydroxide such as magnesium hydroxide, flexibility and processability and abrasion resistance are compromised. As another example, when the flame retardant composition comprises substantial amounts of a liquid organic phosphate flame retardant, the flame retardant can migrate to the surface of the insulation, creating an esthetic problem and, more importantly, compromising the flame retardancy of the thermoplastic composition. There remains a desire for flame retardant poly(arylene ether) compositions that exhibit an improved balance of flame retardancy, physical properties, and esthetic properties.

BRIEF DESCRIPTION OF THE INVENTION

The above-described and other drawbacks are alleviated by a thermoplastic composition, comprising: 20 to 50 weight percent of a poly(arylene ether); 25 to 57 weight percent of total polyolefin; wherein total polyolefin consists of polyolefins and the polyolefin content of block copolymers comprising a poly(alkenyl aromatic) block and a polyolefin block; and 3 to 30 weight percent of a flame retardant composition comprising a metal dialkyl phosphinate; wherein all weight percents are based on the total weight of the thermoplastic composition; wherein the poly(arylene ether) and total polyolefin are present in a weight ratio of 0.53:1 to 1.2:1; and wherein a test sample coated wire exhibits a tensile stress at break of at least 10 megapascals, measured at 23° C. according to UL 1581, Section 470, a tensile elongation at break of at least 100 percent, measured at 23° C. according to UL 1581, Section 470, and a passing flame test rating according to UL 1581, Section 1080, wherein the test sample coated wire consists of an AWG 24 conductor having a nominal cross sectional area of 0.205 millimeter$^2$, and a tubular covering comprising the thermoplastic composition and having a nominal outer diameter of 2 millimeters.

Another embodiment is an extruded article comprising the thermoplastic composition.

Another embodiment is a coated wire, comprising: a conductor, and a covering disposed on the conductor; wherein the covering comprises the thermoplastic composition.

These and other embodiments are described in detail below.

DETAILED DESCRIPTION OF THE INVENTION

The present inventors have conducted research on poly (arylene ether) compositions for wire and cable insulation. In the course of that research, they have discovered that a particularly desirable and improved balance of flame retardancy properties, physical properties, and esthetic properties are obtained when a poly(arylene ether) composition comprising very particular component amounts is present. One surprising aspect of this discovery is that the improved property balance is obtained, in part, by controlling the amount of total polyolefin. The term "total polyolefin" includes not only olefin homopolymers (such as polyethylene, polypropylene, and poly(l-butene), and olefin copolymers (such as linear low-density polyethylene (LLDPE), ethylene-propylene-diene monomer copolymers (EPDM), and the copolymers of butene isomers known as polybutenes), but also the polyolefin segments of block copolymers (such as the poly(ethylene-butylene) segment of a polystyrene-poly(ethylene-butylene)-polystyrene block copolymer). In other words, whereas previous patent documents have described poly(arylene ether)-polyolefin compositions in terms of separate amounts of polyolefins and styrenic block copolymer, the present inventors have discovered that the total polyolefin content as defined above is a previously unrecognized result-effective variable in predicting and controlling flame retardancy properties, physical properties, and esthetic properties.

One embodiment is a thermoplastic composition, comprising: 20 to 50 weight percent of a poly(arylene ether); 25 to 57 weight percent of total polyolefin; wherein total polyolefin consists of polyolefins and the polyolefin content of block copolymers comprising a poly(alkenyl aromatic) block and a polyolefin block; and 3 to 30 weight percent of a flame retardant composition comprising a metal dialkyl phosphinate; wherein all weight percents are based on the total weight of the thermoplastic composition; wherein the poly(arylene ether) and total polyolefin are present in a weight ratio of 0.53:1 to 1.2:1; and wherein a test sample coated wire exhibits a tensile stress at break of at least 10 megapascals, measured at 23° C. according to UL 1581, Section 470, a tensile elongation at break of at least 100 percent, measured at 23° C. according to UL 1581, Section 470, and a passing flame test rating according to UL 1581, Section 1080, wherein the test sample coated wire consists of an AWG 24 conductor (according to UL1581, 4th Edition, Oct. 31, 2001, Section 20, Table 20.1) having a nominal cross sectional area of 0.205 millimeter$^2$, and a tubular covering comprising the thermoplastic composition and having a nominal outer diameter of 2 millimeters. The copper conductor consists of twenty twisted copper threads, each having a diameter of 0.12 millimeter. In some embodiments, the a test sample coated wire exhibits a passing flame test rating according to UL 1581, Section 1080. The passing flame test rating according to UL 1581, Section 1080 is assessed according to Section 1080.14. Specifically, the coated wire passes the test if (1) no specimen shows more than 25 percent of the indicator flag burned away or charred after any of the five applications of flame; and (2) no specimen emits flaming or glowing particles or foaming drops at any time that ignite the cotton, or continues to flame longer than 60 seconds after any application of the gas flame; and (3) if any specimen emits flaming or glowing particles or flaming drops at any time that fall outside the area of the testing surface covered by the cotton and/or that fall onto the wedge or burner, a repeat test according to Section 1080.14 is to be conducted, and none of the cotton is to ignite in the repeat test and the specimen does not continue flaming longer than 60 seconds after any application of the gas flame.

In some embodiments, the thermoplastic composition comprises 20 to 44 weight percent of a poly(arylene ether); 29 to 57 weight percent of total polyolefin; wherein total polyolefin consists of polyolefins and the polyolefin content of block copolymers comprising a poly(alkenyl aromatic) block and a polyolefin block; and 10 to 25 weight percent of a flame retardant composition comprising 1 to 10 weight percent of a metal dialkyl phosphinate, 1 to 17 weight percent of a nitrogen-containing flame retardant selected from the group consisting of melamine phosphate, melamine pyrophosphate, melamine polyphosphates, and mixtures thereof, and 1 to 10 weight percent of a triaryl phosphate that is a liquid at one atmosphere and at least one temperature in the range 25 to 50° C.; wherein all weight percents are based on the total weight of the thermoplastic composition; and wherein the poly(arylene ether) and total polyolefin are present in a weight ratio of 0.53:1 to 1.2:1. In these embodiments, the test sample coated wire (specifically, its covering) can exhibit a tensile stress at break of 10 to 30 megapascals, specifically 10 to 27 megapascals, more specifically 14 to 27 megapascals, still more specifically 17 to 27 megapascals, measured at 23° C. according to UL1581, Section 470; and a tensile elongation at break of 100 to 240 percent, specifically 150 to 240 percent, more specifically 170 to 240 percent, yet more specifically 190 to 240 percent, measured at 23° C. according to UL1581, Section 470. In some embodiments, the test sample coated wire further exhibits a heat deformation of 5 to 40 percent, specifically 5 to 30 percent, more specifically 5 to 25 percent, even more specifically 5 to 15 percent, still more specifically 5 to 10 percent, measured at 121° C. and a 250 gram load according to UL 1581. In some embodiments, the test sample coated wire exhibits a triaryl phosphate migration rating of 0, 1, or 2, measured as described in the working examples.

In some embodiments, the thermoplastic composition comprises 20 to 50 weight percent of a poly(arylene ether); 25 to 57 weight percent of total polyolefin; wherein total polyolefin consists of polyolefins and the polyolefin content of block copolymers comprising a poly(alkenyl aromatic) block and a polyolefin block; and 3 to 25 weight percent of a flame retardant composition comprising 1 to 15 weight percent of a metal dialkyl phosphinate; and 1 to 20 weight percent of a nitrogen-containing flame retardant selected from the group consisting of melamine phosphate, melamine pyrophosphate, melamine polyphosphates, and mixtures thereof; wherein the flame retardant composition excludes triaryl phosphates that are liquids at one atmosphere and at least one temperature in the range 25 to 50° C.; wherein all weight percents are based on the total weight of the thermoplastic composition; wherein the poly(arylene ether) and total polyolefin are present in a weight ratio of 0.56:1 to 1.2:1; wherein the nitrogen-containing flame retardant and the metal dialkyl phosphinate are present in a ratio of 0.2:1 to 5:1. In these embodiments, the test sample coated wire (specifically, its covering) can exhibit a tensile stress at break of 10 to 30 megapascals, specifically 15 to 25 megapascals, more specifically 19 to 23 megapascals, measured at 23° C. according to UL1581, Section 470; and a tensile elongation at break of 100 to 350 percent, specifically 150 to 300 percent, more specifically 200 to 240 percent, measured at 23° C. according to UL1581, Section 470. In some embodiments, the test sample coated wire further exhibits a heat deformation of 5 to 50 percent, specifically 10 to 30 percent, more specifically 10 to 15 percent, measured at 121° C. and a 250 gram load according to UL 1580. In some embodiments, the test sample coated wire (specifically, its covering) exhibits a tensile stress at break of 10 to 30 megapascals, specifically 15 to 25 megapascals, more specifically 19 to 23 megapascals, measured at 23° C. according to UL1581, Section 470; and a tensile elongation at break of 100 to 350 percent, specifically 150 to 300 percent, more specifically 200 to 240 percent, measured at 23° C. according to UL1581, Section 470. In some embodiments, the test sample coated wire further exhibits a heat deformation of 5 to 50 percent, specifically 10 to 30 percent, more specifically 10 to 15 percent, measured at 121° C. and a 250 gram load according to UL 1580.

In some embodiments, the thermoplastic composition comprises 20 to 50 weight percent of a poly(arylene ether); 25 to 57 weight percent of total polyolefin; wherein total polyolefin consists of polyolefins and the polyolefin content of block copolymers comprising a poly(alkenyl aromatic) block and a polyolefin block; and 3 to 30 weight percent of a flame retardant composition comprising a metal dialkyl phosphinate; wherein the flame retardant composition excludes melamine phosphate, melamine pyrophosphate, and melamine polyphosphate; wherein all weight percents are based on the total weight of the thermoplastic composition; and wherein the poly(arylene ether) and total polyolefin are present in a weight ratio of 0.55:1 to 1.2:1. In these embodiments, a test sample coated wire can exhibit a tensile stress at break of at least 10 megapascals, measured at 23° C. according to UL 1581, Section 470, a tensile elongation at break of at least 100 percent, measured at 23° C. according to UL 1581, Section 470, and a passing flame test rating according to UL 1581, Section 1080, wherein the test sample coated wire consists of an AWG 24 wire (according to UL1581, 4th Edition, Oct. 31, 2001, Section 20, Table 20.1) having a nominal cross sectional area of 0.205 millimeter$^2$, and a tubular covering comprising the thermoplastic composition and having a nominal outer diameter of 2 millimeters. In some embodiments, the test sample coated wire (specifically, its covering) exhibits a tensile stress at break of 10 to 25 megapascals, specifically 15 to 25 megapascals, more specifically 20 to 25 megapascals, measured at 23° C. according to UL1581, Section 470; and a tensile elongation at break of 100 to 360 percent, specifically 150 to 300 percent, more specifically 200 to 250 percent, measured at 23° C. according to UL1581, Section 470. In some embodiments, the test sample coated wire further exhibits a heat deformation of 5 to 20 percent, specifically 10 to 15 percent, measured at 121° C. and a 250 gram load according to UL 1580.

The thermoplastic composition comprises a poly(arylene ether). Suitable poly(arylene ether)s include those comprising repeating structural units having the formula

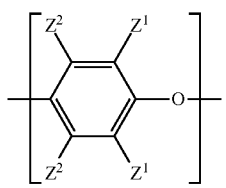

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue may also contain one or more carbonyl groups, amino groups, hydroxyl groups, or the like, or it may contain heteroatoms within the backbone of the hydrocarbyl residue. As one example, $Z^1$ may be a di-n-butylaminomethyl group formed by reaction of a terminal 3,5-dimethyl-1,4-phenyl group with the di-n-butylamine component of an oxidative polymerization catalyst.

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether).

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

In some embodiments, the poly(arylene ether) has an intrinsic viscosity of 0.1 to 1 deciliter per gram measured at 25° C. in chloroform. Specifically, the poly(arylene ether) intrinsic viscosity may be 0.2 to 0.8 deciliter per gram, more specifically 0.3 to 0.6 deciliter per gram, still more specifically 0.4 to 0.5 deciliter per gram.

In general, the thermoplastic composition comprises 20 to 50 weight percent of a poly(arylene ether), based on the total weight of the thermoplastic composition. Within this range, the poly(arylene ether) amount can be 25 to 45 weight percent, specifically 30 to 40 weight percent, more specifically 35 to 40 weight percent. In embodiments in which the flame retardant composition comprises metal dialkyl phosphinate, nitrogen-containing flame retardant, and triaryl phosphate, the thermoplastic composition can comprise 20 to 44 weight percent of a poly(arylene ether), based on the total weight of the thermoplastic composition. Within this range, the poly(arylene ether) amount can be 28 to 44 weight percent, specifically 30 to 42 weight percent, more specifically 30 to 36 weight percent. In embodiments in which the flame retardant composition comprises metal dialkyl phosphinate and nitrogen-containing flame retardant but excludes triaryl phosphate, the thermoplastic composition can comprise 20 to 50 weight percent of a poly(arylene ether), based on the total weight of the thermoplastic composition. Within this range, the poly(arylene ether) amount can be 30 to 47 weight percent, specifically 37 to 47 weight percent. In embodiments in which the flame retardant composition comprises metal dialkyl phosphinate but excludes nitrogen-containing flame retardant, the thermoplastic composition can comprise 20 to 50 weight percent of a poly(arylene ether), based on the total weight of the thermoplastic composition. Within this range, the poly(arylene ether) amount can be 30 to 47 weight percent, specifically 39 to 47 weight percent.

In addition to the poly(arylene ether), the thermoplastic composition comprises 25 to 57 weight percent of total polyolefin. As mentioned above, the total polyolefin consists of consists of polyolefins and the polyolefin content of block copolymers comprising a poly(alkenyl aromatic) block and a polyolefin block. The term "polyolefins" includes olefin homopolymers. Exemplary homopolymers include polyethylene, high density polyethylene (HDPE), medium density polyethylene (MDPE), and isotactic polypropylene. Polyolefins further includes olefin copolymers. Such copolymers include copolymers of ethylene and alpha olefins like 1-octene, propylene and 4-methyl-1-pentene as well as copolymers of ethylene and one or more rubbers and copolymers of propylene and one or more rubbers. Copolymers of ethylene and $C_3$-$C_{10}$ monoolefins and non-conjugated dienes, herein referred to as EPDM copolymers, are also included in the total polyolefin. Examples of suitable $C_3$-$C_{10}$ monoolefins for EPDM copolymers include propylene, 1-butene, 2-butene, 1-pentene, 2-pentene, 1-hexene, 2-hexene, 3-hexene, and the like. Suitable dienes include 1,4-hexadiene and monocylic and polycyclic dienes. Mole ratios of ethylene to other $C_3$-$C_{10}$ monoolefin monomers can range from 95:5 to 5:95 with diene units being present in the amount of from 0.1 to 10 mole percent. EPDM copolymers can be functionalized with an acyl group or electrophilic group for grafting onto the polyphenylene ether as disclosed in U.S. Pat. No. 5,258,455 to Laughner et al. Olefin copolymers further include linear low density polyethylene (LLDPE). Total polyolefin further includes the polyolefin segments of block copolymers, such as the poly(ethylene-butylene) segment of a polystyrene-poly(ethylene-butylene)-polystyrene block copolymer, and the poly(ethylene-propylene) segment of a polystyrene-poly(ethylene-propylene) diblock copolymer.

In some embodiments, the total polyolefin is selected from the group consisting of ethylene-octene copolymers, ethylene-butene copolymers, ethylene-propylene copolymers, polypropylenes, polybutenes, the poly(ethylene-propylene) blocks of polystyrene-poly(ethylene-propylene)-polystyrene triblock copolymers, the poly(ethylene-butylene) blocks of polystyrene-poly(ethylene-butylene)-polystyrene triblock copolymers, and mixtures thereof. In some embodiments, the total polyolefin is selected from the group consisting of polypropylenes, polybutenes, the poly(ethylene-propylene) blocks of polystyrene-poly(ethylene-propylene)-polystyrene triblock copolymers, the poly(ethylene-butylene) blocks of polystyrene-poly(ethylene-butylene)-polystyrene triblock copolymers, and mixtures thereof.

In general, the total polyolefin amount is 25 to 57 weight percent, specifically 30 to 52 weight percent, more specifically 35 to 47 weight percent, all based on the total weight of the composition. In embodiments in which the flame retardant composition comprises metal dialkyl phosphinate, nitrogen-containing flame retardant, and triaryl phosphate, the total polyolefin amount can be 29 to 57 weight percent, specifically 34 to 51 weight percent, more specifically 38 to 46 weight percent, based on the total weight of the thermoplastic composition. In embodiments in which the flame retardant composition comprises metal dialkyl phosphinate and nitrogen-containing flame retardant but excludes triaryl phosphate, the total polyolefin amount can be 25 to 50 weight percent, specifically 30 to 50 weight percent, more specifically 34 to 43 weight percent, based on the total weight of the thermoplastic composition. In embodiments in which the flame retardant composition comprises metal dialkyl phosphinate but excludes nitrogen-containing flame retardant, the total polyolefin amount can be 25 to 57 weight percent, specifically 30 to 50 weight percent, more specifically 35 to 42 weight percent, based on the total weight of the thermoplastic composition.

It is not just the specific amounts of poly(arylene ether) and total polyolefin that are important to achieving the desired properties. The ratio of these components is also important. In general, the poly(arylene ether) and total polyolefin are present in a weight ratio of 0.53:1 to 1.2:1, specifically 0.55:1 to 1.1:1, more specifically 0.56:1 to 1:1, still more specifically 0.7:1 to 1:1. In embodiments in which the flame retardant composition comprises metal dialkyl phosphinate, nitrogen-containing flame retardant, and triaryl phosphate, the weight ratio of poly(arylene ether) to total polyolefin can be 0.53:1 to 1.2:1, specifically 0.6:1 to 1:1, more specifically 0.6:1 to 0.9:1, even more specifically 0.7:1 to 0.9:1. In embodiments in which the flame retardant composition comprises metal dialkyl phosphinate and nitrogen-containing flame retardant but excludes triaryl phosphate, the weight ratio of poly(arylene ether) to total polyolefin can be 0.56:1 to 1.2:1, specifically 0.7:1 to 1.2:1, more specifically 0.9:1 to 1.2:1. In embodiments in which the flame retardant composition comprises metal dialkyl phosphinate but excludes nitrogen-containing flame retardant, the weight ratio of poly(arylene ether) to total polyolefin can be 0.55:1 to 1.2:1, specifically 0.8:1 to 1.2:1, more specifically 1.1:1 to 1.2:1.

As mentioned above in the context of total polyolefin, the thermoplastic composition can comprise a block copolymer comprising a poly(alkenyl aromatic) block and a polyolefin block. In some embodiments, the polyolefin block is a poly(conjugated diene) or a hydrogenated poly(conjugated diene). The block copolymer may comprise about 15 to about 80 weight percent of poly(alkenyl aromatic) content and about 20 to about 85 weight percent of unhydrogenated or hydrogenated poly(conjugated diene) content. In some embodiments, the poly(alkenyl aromatic) content of the block copolymer is about 20 to 40 weight percent. In other embodiments, the poly(alkenyl aromatic) content of the block copolymer is greater than 40 weight percent to about 90 weight percent, specifically about 55 to about 80 weight percent.

In some embodiments, the block copolymer has a weight average molecular weight of about 3,000 to about 400,000 atomic mass units. The number average molecular weight and the weight average molecular weight can be determined by gel permeation chromatography and based on comparison to polystyrene standards. In some embodiments, the block copolymer has a weight average molecular weight of 40,000 to 400,000 atomic mass units, specifically 200,000 to 400,000 atomic mass units, more specifically 220,000 to 350,000 atomic mass units. In other embodiments, the block copolymer has a weight average molecular weight of 40,000 to less than 200,000 atomic mass units, specifically 40,000 to 180,000 atomic mass units, more specifically 40,000 to 150,000 atomic mass units.

The alkenyl aromatic monomer used to prepare the block copolymer can have the structure

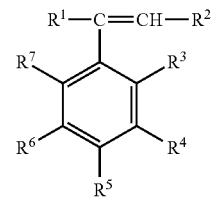

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, or a $C_1$-$C_8$ alkyl group; and $R^4$, $R^5$, and $R^6$ each independently represent a hydrogen atom, a $C_1$-$C_8$ alkyl group, or a $C_2$-$C_8$ alkenyl group, or $R^3$ and $R^4$ are taken together with the central aromatic ring to form a naphthyl group, or $R^4$ and $R^5$ are taken together with the central aromatic ring to form a naphthyl group. Specific alkenyl aromatic monomers include, for example, styrene and methylstyrenes such as alpha-methylstyrene and p-methylstyrene. In some embodiments, the alkenyl aromatic monomer is styrene.

The conjugated diene used to prepare the block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The block copolymer is a copolymer comprising (A) at least one block derived from an alkenyl aromatic compound and (B) at least one block derived from a conjugated diene. In some embodiments, the aliphatic unsaturation in the (B) block is reduced at least 50 percent, specifically at least 70 percent, by hydrogenation. The arrangement of blocks (A) and (B) includes a linear structure, a grafted structure, and a radial teleblock structure with or without a branched chain. Linear block copolymers include tapered linear structures and non-tapered linear structures. In some embodiments, the block copolymer has a tapered linear structure. In some embodiments, the block copolymer has a non-tapered linear structure. In some embodiments, the block copolymer comprises a B block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B, wherein the molecular weight of each A block may be the same as or different from that of other A blocks, and the molecular weight of each B block may be the same as or different from that of other B blocks. In some embodiments, the block copolymer is a diblock copolymer, a triblock copolymer, or a combination thereof. In some embodiments, the block copolymer is a polystyrene-poly(ethylene-butylene)-polystyrene triblock copolymer.

In some embodiments, the block copolymer excludes the residue of monomers other than the alkenyl aromatic compound and the conjugated diene. In some embodiments, the block copolymer consists of blocks derived from the alkenyl aromatic compound and the conjugated diene. In these embodiments it does not comprise grafts formed from these or any other monomers; it also consists of carbon and hydrogen atoms and therefore excludes heteroatoms.

In other embodiments, the block copolymer includes the residue of one or more acid functionalizing agents, such as maleic anhydride.

Methods of preparing block copolymers are known in the art and many hydrogenated block copolymers are commercially available. Illustrative commercially available hydrogenated block copolymers include the polystyrene-poly(ethylene-propylene) diblock copolymers available from Kraton Polymers as Kraton G1701 and G1702; the polystyrene-poly(ethylene-butylene)-polystyrene triblock copolymers available from Kraton Polymers as Kraton G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as Kraton RP-6935 and RP-6936, the polystyrene-poly(ethylene-propylene)-polystyrene triblock copolymers available from Kraton Polymers as Kraton G1730; the maleic anhydride-grafted polystyrene-poly(ethylene-butylene)-polystyrene triblock copolymers available from Kraton Polymers as Kraton G1901, G1924, and MD-6684; the maleic anhydride-grafted polystyrene-poly(ethylene-butylene-styrene)-polystyrene triblock copolymer available from Kraton Polymers as Kraton MD-6670; the polystyrene-poly(ethylene-butylene)-polystyrene triblock copolymer comprising 67 weight percent polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and P2000; the polystyrene-polybutadiene-poly(styrene-butadiene)-polybutadiene block copolymer available from Asahi Kasei Elastomer as S.O.E.-SS L601; the hydrogenated radial block copolymers available from Chevron Phillips Chemical Company as K-Resin KK38, KR01, KR03, and KR05; the polystyrene-poly(ethylene-butylene)-polystyrene triblock copolymer comprising about 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising about 65 weight percent polystyrene available from Kuraray as SEPTON S2104. Mixtures of two of more block copolymers may be used. Illustrative commercially available unhydrogenated block copolymers include the KRATON® D series polymers, including KRATON® D1101 and D1102, from Kraton Polymers, and the styrene-butadiene radial teleblock copolymers available as, for example, K-RESIN KR01, KR03, KR05, and KR10 sold by Chevron Phillips Chemical Company.

The thermoplastic composition can comprise the block copolymer in an amount of 15 to 50 weight percent, specifically 22 to 43 weight percent, more specifically 30 to 40 weight percent, based on the total weight of the thermoplastic composition.

In addition to the poly(alkenyl aromatic) blocks present in the block copolymer, the thermoplastic composition can comprise homopolymers and copolymers of alkenyl aromatic monomers. As used herein the term "copolymer of alkenyl aromatic monomers" refers to a copolymer of monomers consisting of two or more different alkenyl aromatic monomers. Homopolymers of alkenyl aromatic monomers include polystyrenes, including atactic and syndiotactic polystyrenes. Copolymers of alkenyl aromatic monomers include copolymers of two or more monomers selected from the group consisting of styrene, methylstyrenes, and t-butylstyrenes. The homopolymers and copolymers of alkenyl aromatic monomers, when present, can be used in an amount of 2 to 20 weight percent, specifically 5 to 15 weight percent, based on the total weight of the thermoplastic composition.

The total poly(alkenyl aromatic) content of the thermoplastic composition consists of poly(alkenyl aromatic)s (that is, homopolymers and copolymers of alkenyl aromatic monomers) and the poly(alkenyl aromatic) content of block copolymers comprising a poly(alkenyl aromatic) block and a polyolefin block. In general, this total poly(alkenyl aromatic) content is 3 to 20 weight percent, specifically 5 to 18 weight percent, more specifically 7 to 16 weight percent, based on the total weight of the thermoplastic composition. In embodiments in which the flame retardant composition comprises metal dialkyl phosphinate, nitrogen-containing flame retardant, and triaryl phosphate, the total poly(alkenyl aromatic) content is 8 to 20 weight percent, specifically 9 to 18 weight percent, more specifically 11 to 16 weight percent, based on the total weight of the thermoplastic composition. In embodiments in which the flame retardant composition comprises metal dialkyl phosphinate and nitrogen-containing flame retardant but excludes triaryl phosphate, the total poly(alkenyl aromatic) content is 3 to 20 weight percent, specifically 8 to 16 weight percent, more specifically 11 to 16 weight percent, based on the total weight of the thermoplastic composition. In embodiments in which the flame retardant composition comprises metal dialkyl phosphinate but excludes nitrogen-containing flame retardant, the this total poly(alkenyl aromatic) content is 3 to 20 weight percent, specifically 8 to 20 weight percent, more specifically 9 to 18 weight percent, more specifically 11 to 16 weight percent, based on the total weight of the thermoplastic composition.

In addition to the poly(arylene ether) and the total polyolefin, the thermoplastic composition comprises a flame retardant composition. The flame retardant composition comprises a metal dialkyl phosphinate. In some embodiments, the flame retardant composition comprises a metal dialkyl phosphinate, a nitrogen-containing flame retardant (defined below), and a triaryl phosphate that is a liquid at one atmosphere and at least one temperature in the range 25 to 50° C. In some embodiments, the flame retardant composition comprises a metal dialkyl phosphinate and the nitrogen-containing flame retardant but excludes any triaryl phosphate that is a liquid at one atmosphere and at least one temperature in the range 25 to 50° C. In some embodiments, the flame retardant composition comprises a metal dialkyl phosphinate but excludes the nitrogen-containing flame retardant.

As used herein, the term "metal dialkyl phosphinate" refers to a salt comprising at least one metal cation and at least one dialkyl phosphinate anion. In some embodiments, the metal dialkyl phosphinate has the formula

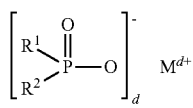

wherein $R^1$ and $R^2$ are each independently $C_1$-$C_6$ alkyl; M is calcium, magnesium, aluminum, or zinc; and d is 2 or 3. Examples of $R^1$ and $R^2$ include methyl, ethyl, n-propyl, isopropyl, n-butyl, tert-butyl, n-pentyl, and phenyl. In some embodiments, $R^1$ and $R^2$ are ethyl, M is aluminum, and d is 3 (that is, the metal dialkyl phosphinate is aluminum tris(diethyl phosphinate)).

In some embodiments, the metal dialkyl phosphinate is in particulate form. The metal dialkyl phosphinate particles may have a median particle diameter (D50) less than or equal to 40 micrometers, or, more specifically, a D50 less than or equal to 30 micrometers, or, even more specifically, a D50 less than or equal to 25 micrometers. Additionally, the metal dialkyl phosphinate may be combined with a polymer, such as a poly(arylene ether), a polyolefin, a polyamide, a block copolymer, or combination thereof, to form a masterbatch. The metal dialkyl phosphinate masterbatch comprises the metal dialkyl phosphinate in an amount greater than is present in the thermoplastic composition. Employing a masterbatch for the addition of the metal dialkyl phosphinate to the other components of the thermoplastic composition can facilitate addition and improve distribution of the metal dialkyl phosphinate.

The nitrogen-containing flame retardant is defined herein as comprising a nitrogen-containing heterocyclic base and a phosphate or pyrophosphate or polyphosphate acid. In some embodiments, the nitrogen-containing flame retardant has the formula

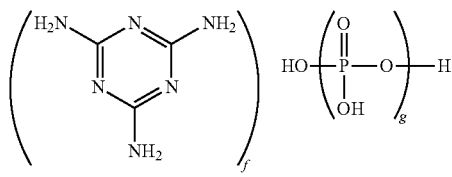

wherein g is 1 to about 10,000 and the ratio of f to g is about 0.5:1 to about 1.7:1, specifically 0.7:1 to 1.3:1, more specifically 0.9:1 to 1.1:1. It will be understood that this formula includes species in which one or more protons are transferred from the polyphosphate group to the melamine group(s). When g is 1, the nitrogen-containing flame retardant is melamine phosphate (CAS Reg. No. 20208-95-1). When g is 2, the nitrogen-containing flame retardant is melamine pyrophosphate (CAS Reg. No. 15541-60-3). When g is, on average, greater than 2, the nitrogen-containing flame retardant is melamine polyphosphate (CAS Reg. No. 56386-64-2). In some embodiments, the nitrogen-containing flame retardant is melamine pyrophosphate, melamine polyphosphate, or a mixture thereof. In some embodiments in which the nitrogen-containing flame retardant is melamine polyphosphate, g has an average value of greater than 2 to about 10,000, specifically about 5 to about 1,000, more specifically about 10 to about 500. In some embodiments in which the nitrogen-containing flame retardant is melamine polyphosphate, g has an average value of greater than 2 to about 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in International Patent Application No. WO 98/08898 A1 to Jacobson et al.

The nitrogen-containing flame retardant can have a low volatility relative to temperatures used to thermally cure the curable composition. For example, in some embodiments, the nitrogen-containing flame retardant exhibits less than 1 percent weight loss by thermogravimetric analysis when heated at a rate of 20° C. per minute from 25 to 280° C., specifically 25 to 300° C., more specifically 25 to 320° C.

In some embodiments, the flame retardant composition comprises a triaryl phosphate that is a liquid at one atmosphere and at least one temperature in the range 25 to 50° C. Triaryl phosphates that are liquids at one atmosphere and at least one temperature in the range 25 to 50° C. include, for example, resorcinol bis(diphenyl phosphate), resorcinol bis(di-2,6-dimethylphenyl phosphate), bisphenol A bis(diphenyl phosphate), resorcinol bis(di-2,6-dimethylphenyl phosphate), alkylated triphenyl phosphates (such as methylated triphenyl phosphates and butylated triphenyl phosphates), and the like, and mixtures thereof.

When the flame retardant composition comprises a triaryl phosphate, the triaryl phosphate can be used in an amount that is sufficient to exert substantial flame retardancy and antiplasticizing effects, yet its migration to the surface of a molded article, such as extrusion molded wire insulation, is significantly reduced compared to poly(arylene ether) compositions in which similar flame retardancy is achieved solely with triaryl phosphate. Thus, in some embodiments, the test sample coated wire described above exhibits a triaryl phosphate migration rating of 0, 1, or 2, measured as described in the working examples In general, the thermoplastic composition comprises the flame retardant composition in an amount of 3 to 30 weight percent, specifically 4 to 20 weight percent, more specifically 5 to 15 weight percent, based on the total weight of the composition.

In embodiments in which the flame retardant composition comprises metal dialkyl phosphinate, nitrogen-containing flame retardant, and triaryl phosphate, the thermoplastic composition can comprise the flame retardant composition in an amount of 10 to 25 weight percent, specifically 11 to 20 weight percent, more specifically 11 to 14 weight percent, based on the total weight of the thermoplastic composition. These ranges include a metal dialkyl phosphinate amount of 1 to 10 weight percent, specifically 1 to 7 weight percent, more specifically 1 to 6 weight percent, even more specifically 1 to 5 weight percent, still more specifically 1 to 4 weight percent, yet more specifically 1 to 3 weight percent; a nitrogen-containing flame retardant amount of 1 to 17 weight percent, specifically 1 to 12 weight percent, more specifically 1 to 7 weight percent, even more specifically 1 to 4 weight percent, yet more specifically 1 to 3 weight percent; and a triaryl phosphate amount of 1 to 10 weight percent, specifically 3 to 10 weight percent, more specifically 4 to 9 weight percent, even more specifically 6 to 9 weight percent.

In embodiments in which the flame retardant composition comprises metal dialkyl phosphinate and nitrogen-containing flame retardant but excludes triaryl phosphate, the thermoplastic composition can comprise the flame retardant composition in an amount of 3 to 25 weight percent, specifically 4 to 20 weight percent, more specifically 4 to 15 weight percent, still more specifically 4 to 10 weight percent, even more specifically 4 to 8 weight percent, based on the total weight of the thermoplastic composition. These ranges include a metal dialkyl phosphinate amount of 1 to 15 weight percent, specifically 2 to 10 weight percent, more specifically 2 to 7 weight percent, even more specifically 2 to 4 weight percent; and a nitrogen-containing flame retardant amount of 1 to 20 weight percent, specifically 2 to 15 weight percent, more specifically 2 to 10 weight percent, even more specifically 2 to 7 weight percent, yet more specifically 2 to 4 weight percent.

In embodiments in which the flame retardant composition comprises metal dialkyl phosphinate but excludes nitrogen-containing flame retardant, the composition can comprise the flame retardant composition in an amount of 3 to 30 weight percent, specifically 4 to 20 weight percent, more specifically 4 to 10 weight percent, even more specifically 4 to 8 weight percent, still more specifically 4 to 6 weight percent, based on the total weight of the thermoplastic composition.

In some embodiments, the thermoplastic composition comprises the nitrogen-containing flame retardant and the metal dialkyl phosphinate in a weight ratio of 1 to 9, specifically 2 to 8, more specifically 2 to 7, still more specifically 2 to 6, even more specifically 2 to 5. In some embodiments, the thermoplastic composition comprises the triaryl phosphate and the metal dialkyl phosphinate in a weight ratio of 0.6 to 7, specifically 0.8 to 3, more specifically 1 to 2. In some embodiments, the thermoplastic composition comprises the triaryl phosphate and the nitrogen-containing flame retardant in a weight ratio of 0.2 to 4, specifically 0.3 to 1.5, more specifically 0.3 to 1.

In some embodiments in which it is present, the liquid triaryl phosphate represents 10 to 70 percent of the total weight of the flame retardant composition. Specifically, the weight percent of liquid triaryl phosphate based on the total weight of the flame retardant composition can be 10 to 60 percent, more specifically 20 to 60 percent.

In some embodiments in which the nitrogen-containing flame retardant is present, the nitrogen-containing flame retardant and the metal dialkyl phosphate are present in a weight ratio of 0.5 to 8 (i.e., a weight ratio range of 0.5:1 to 8:1), specifically 0.5 to 4, more specifically 0.5 to 2.

In some embodiments, the flame retardant composition consists of the metal dialkyl phosphinate, the nitrogen-containing flame retardant, and the triaryl phosphate.

In some embodiments, the flame retardant composition consists of the metal dialkyl phosphinate and the nitrogen-containing flame retardant.

In some embodiments, the flame retardant composition consists of the metal dialkyl phosphinate and the triaryl phosphate.

In some embodiments, the flame retardant composition consists of the metal dialkyl phosphinate.

In some embodiments, additional flame retardant components can be used. For example, the flame retardant composition can further comprise 0.05 to 2.5 weight percent zinc borate, based on the total weight of the thermoplastic composition. Specifically, the zinc borate amount can be 0.1 to 5 weight percent, more specifically 0.2 to 5 weight percent.

In some embodiments, the thermoplastic composition further comprises a flow promoting resin to improve the processing characteristics of the thermoplastic composition. The flow promoting resin has a glass transition temperature or a melting temperature of 30 to 175° C., specifically 50 to 170° C., more specifically 70 to 165° C., more specifically 100 to 160° C., even more specifically 100 to 155° C. Suitable polymer resins include, for example, polystyrenes, hydrocarbon waxes, hydrocarbon resins, fatty acids, polyolefins, polyesters, fluoropolymers, epoxy resins, phenolic resins, rosins and rosin derivatives, terpene resins, acrylate resins, and combinations thereof. When the flow promoting resin is a polyolefin, the thermoplastic composition comprises at least one other polyolefin component.

The thermoplastic composition may, optionally, further comprise various additives known in the thermoplastics art. For example, the thermoplastic composition may, optionally, further comprise an additive chosen from stabilizers, mold release agents, processing aids, drip retardants, nucleating agents, UV blockers, dyes, pigments, antioxidants, anti-static agents, blowing agents, mineral oil, metal deactivators, anti-blocking agents, nanoclays, and the like, and combinations thereof.

In some embodiments, the thermoplastic composition excludes any polymer not described herein as required or optional. In some embodiments, the thermoplastic composition excludes any flame retardant not described herein as required or optional. In some embodiments, the thermoplastic composition excludes fillers.

In one embodiment, the thermoplastic composition comprises 30 to 36 weight percent of a poly(arylene ether), wherein the poly(arylene ether) is a poly(2,6-dimethyl-1,4-phenylene ether) having an intrinsic viscosity of 0.3 to 0.6 deciliter per gram measured in chloroform at 25° C.; 38 to 46 weight percent of total polyolefin weight percent of total polyolefin, wherein the total polyolefin comprises polypropylene, ethylene-propylene copolymer, and a poly(ethylene-co-butylene) block of a block copolymer comprising a polystyrene block and a poly(ethylene-co-butylene) block; 10 to 14 weight percent of a flame retardant composition consisting of 1 to 3 weight percent of aluminum tris(diethyl phosphinate), 1 to 3 weight percent of melamine polyphosphate, and 6 to 10 weight percent of bisphenol A bis(diphenyl phosphate); wherein the poly(arylene ether) and total polyolefin are present in a weight ratio of 0.6 to 0.9; and wherein a test sample coated wire exhibits a tensile stress at break of 10 to 30 megapascals, measured at 23° C. according to UL1581, Section 470, a tensile elongation at break of 100 to 240 percent, measured at 23° C. according to UL1581, Section 470, and a passing flame test rating according to UL 1581, Section 1080, wherein the test sample coated wire consists of an AWG 24 conductor having a nominal cross sectional area of 0.205 millimeter$^2$, and a tubular covering comprising the thermoplastic composition and having a nominal outer diameter of 2 millimeters.

In one embodiment, the thermoplastic composition comprises 37 to 47 weight percent of the poly(arylene ether), wherein the poly(arylene ether) is a poly(2,6-dimethyl-1,4-phenylene ether) having an intrinsic viscosity of 0.3 to 0.6 deciliter per gram measured in chloroform at 25° C.; 34 to 43 weight percent of total polyolefin weight percent of total polyolefin, wherein the total polyolefin comprises polypropylene, polybutene, ethylene-propylene copolymer, a poly(ethylene-co-propylene) block of a block copolymer comprising a polystyrene block and a poly(ethylene-co-propylene) block, and a poly(ethylene-co-butylene) block of a block copolymer comprising a polystyrene block and a poly(ethylene-co-butylene) block; and 4 to 12 weight percent of the flame retardant composition consisting of 2 to 6 weight percent of aluminum tris(diethyl phosphinate), and 2 to 6 weight percent of melamine polyphosphate; wherein the poly(arylene ether) and total polyolefin are present in a weight ratio of 0.8 to 1.2; and wherein the test sample coated wire exhibits a tensile stress at break of 10 to 25 megapascals, measured at 23° C. according to UL1581, Section 470, a tensile elongation at break of 200 to 300 percent, measured at 23° C. according to UL1581, Section 470, and a passing flame test rating according to UL 1581, Section 1080, wherein the test sample coated wire consists of an AWG 24 conductor having a nominal cross sectional area of 0.205 millimeter$^2$, and a tubular covering comprising the thermoplastic composition and having a nominal outer diameter of 2 millimeters.

In one embodiment, the thermoplastic composition comprises 39 to 47 weight percent of the poly(arylene ether), wherein the poly(arylene ether) is a poly(2,6-dimethyl-1,4-phenylene ether) having an intrinsic viscosity of 0.3 to 0.6 deciliter per gram measured in chloroform at 25° C.; 35 to 42 weight percent of total polyolefin weight percent of total polyolefin, wherein the total polyolefin comprises polypropylene, polybutene, ethylene-propylene copolymer, a poly(ethylene-co-propylene) block of a block copolymer comprising a polystyrene block and a poly(ethylene-co-propylene) block, and a poly(ethylene-co-butylene) block of a block copolymer comprising a polystyrene block and a poly(ethylene-co-butylene) block; and 4 to 10 weight percent of the flame retardant composition consisting of aluminum tris(diethyl phosphinate); wherein the poly(arylene ether) and total polyolefin are present in a weight ratio of 0.9 to 1.2; and wherein the test sample coated wire exhibits a tensile stress at break of 10 to 25 megapascals, measured at 23° C. according to UL1581, Section 470, a tensile elongation at break of 150 to 300 percent, measured at 23° C. according to UL1581, Section 470, and a passing flame test rating according to UL 1581, Section 1080, wherein the test sample coated wire consists of an AWG 24 wire having a nominal cross sectional area of 0.205 millimeter, and a tubular covering comprising the thermoplastic composition and having a nominal outer diameter of 2 millimeters.

As the composition is defined as comprising multiple components, it will be understood that each component is chemically distinct, particularly in the instance that a single chemical compound may satisfy the definition of more than one component.

The preparation of the compositions of the present invention is normally achieved by melt blending the ingredients under conditions for the formation of an intimate blend. Such conditions often include mixing in single-screw or twin-screw type extruders or similar mixing devices that can apply a shear to the components.

The thermoplastic composition is well suited for use in fabricating articles via extrusion molding. Thus, one embodiment is an extruded article comprising any of the above-described thermoplastic compositions. In some embodiments, the extruded article is in the form of a hollow tube. In some embodiments, the extruded article is in the form of a tubular covering surrounding a core of an electrically conducting or light conducting medium.

The thermoplastic composition is particularly suited for use in the fabrication of insulation for wire and cable. Methods of fabricating coated wire are known in the art and described, for example, in U.S. Patent Application Publication No. US 2006/0131052 A1 of Mhetar et al. Thus, one embodiment is a coated wire comprising: a conductor, and a covering disposed on the conductor; wherein the covering comprises any of the above-described thermoplastic compositions. It will be understood that the configuration and dimensions of the coated wire claimed are not limited to those of the test sample coated wire for which property values are specified. For example, the coated wire can have a conductor with the dimensions specified in UL 1581, Section 20, Table 20.1 for AWG 35 to AWG 10. As another example, the covering disposed on the conductor can have a thickness of 0.2 to 1 millimeter.

In some embodiments in which the flame retardant composition comprises the metal dialkyl phosphinate, the nitrogen-containing flame retardant, and the triaryl phosphate, the test sample coated wire exhibits a tensile stress at break of 10 to 30 megapascals, measured at 23° C. according to UL1581, Section 470, and a tensile elongation at break of 100 to 240 percent, measured at 23° C. according to UL1581, Section 470. In some embodiments, the test sample coated wire further exhibits an average flame-out time of 9 to 60 seconds, specifically 9 to 50 seconds, more specifically 9 to 40 seconds, even more specifically 9 to 30 seconds, measured according to UL 1581, Section 1080 (VW-1 Vertical Specimen). In some embodiments, the test sample coated wire further exhibits a triaryl phosphate migration rating of 0, 1, or 2, measured as described in the working examples. In some embodiments, the test sample coated wire further exhibits a heat deformation of 5 to 40 percent, specifically 5 to 30 percent, more specifically 5 to 25 percent, even more specifically 5 to 20 percent, yet more specifically 5 to 15 percent, even more specifically 5 to 10 percent, measured at 121° C. and 250 gram load according to UL 1581.

In some embodiments in which the flame retardant composition comprises the metal dialkyl phosphinate and the nitrogen-containing flame retardant but excludes the triaryl phosphate, the test sample coated wire exhibits a tensile stress at break of 10 to 30 megapascals, specifically 15 to 25 megapascals, more specifically 19 to 23 megapascals, measured at 23° C. according to UL1581, Section 470; and a tensile elongation at break of 100 to 350 percent, specifically 150 to 300 percent, more specifically 200 to 240 percent, measured at 23° C. according to UL1581, Section 470.

In some embodiments in which the flame retardant composition comprises the metal dialkyl phosphinate but excludes the nitrogen-containing flame retardant, the test sample coated wire exhibits a tensile stress at break of 10 to 25 megapascals, specifically 15 to 25 megapascals, more specifically 20 to 25 megapascals, measured at 23° C. according to UL1581, Section 470; and a tensile elongation at break of 100 to 360 percent, specifically 150 to 300 percent, more specifically 200 to 250 percent, measured at 23° C. according to UL1581, Section 470.

In some embodiments of the coated wire, the thermoplastic composition comprises 30 to 36 weight percent of the poly(arylene ether); the poly(arylene ether) is a poly(2,6-dimethyl-1,4-phenylene ether) having an intrinsic viscosity of 0.3 to 0.6 deciliter per gram measured in chloroform at 25° C.; the thermoplastic composition comprises 38 to 46 weight percent of total polyolefin weight percent of total polyolefin; the total polyolefin comprises polypropylene, ethylene-propylene copolymer, and a poly(ethylene-co-butylene) block of a block copolymer comprising a polystyrene block and a poly(ethylene-co-butylene) block; wherein the thermoplastic composition comprises 10 to 14 weight percent of the flame retardant composition consisting of 1 to 3 weight percent of aluminum tris(diethyl phosphinate), 1 to 3 weight percent of melamine polyphosphate, and 6 to 10 weight percent of bisphenol A bis(diphenyl phosphate); wherein the poly(arylene ether) and total polyolefin are present in a weight ratio of 0.6 to 0.9; and wherein the coated wire exhibits a tensile stress at break of 10 to 30 megapascals, measured at 23° C. according to UL1581, Section 470, a tensile elongation at break of 100 to 240 percent, measured at 23° C. according to UL1581, Section 470, and a passing flame test rating according to UL 1581, Section 1080.

In some embodiments of the coated wire, the thermoplastic composition comprises 37 to 47 weight percent of the poly(arylene ether), wherein the poly(arylene ether) is a poly(2,6-dimethyl-1,4-phenylene ether) having an intrinsic viscosity of 0.3 to 0.6 deciliter per gram measured in chloroform at 25° C.; 34 to 43 weight percent of total polyolefin weight percent of total polyolefin, wherein the total polyolefin comprises polypropylene, polybutene, ethylene-propylene copolymer, a poly(ethylene-co-propylene) block of a block copolymer comprising a polystyrene block and a poly(ethylene-co-propylene) block, and a poly(ethylene-co-butylene) block of a block copolymer comprising a polystyrene block and a poly(ethylene-co-butylene) block; 4 to 12 weight percent of the flame retardant composition consisting of 2 to 6 weight percent of aluminum tris(diethyl phosphinate), and 2 to 6 weight percent of melamine polyphosphate; wherein the poly(arylene ether) and total polyolefin are present in a weight ratio of 0.8 to 1.2; and wherein the test sample coated wire exhibits a tensile stress at break of 10 to 25 megapascals, measured at 23° C. according to UL1581, Section 470, and a tensile elongation at break of 200 to 300 percent, measured at 23° C. according to UL1581, Section 470.

In some embodiments of the coated wire, the thermoplastic composition comprises 39 to 47 weight percent of the poly(arylene ether), wherein the poly(arylene ether) is a poly(2,6-dimethyl-1,4-phenylene ether) having an intrinsic viscosity of 0.3 to 0.6 deciliter per gram measured in chloroform at 25° C.; 35 to 42 weight percent of total polyolefin weight percent of total polyolefin, wherein the total polyolefin comprises polypropylene, polybutene, ethylene-propylene copolymer, a poly(ethylene-co-propylene) block of a block copolymer comprising a polystyrene block and a poly(ethylene-co-propylene) block, and a poly(ethylene-co-butylene) block of a block copolymer comprising a polystyrene block and a poly(ethylene-co-butylene) block; and 4 to 10 weight percent of the flame retardant composition consisting of aluminum tris(diethyl phosphinate); wherein the poly(arylene ether) and total polyolefin are present in a weight ratio of 0.9 to 1.2; and wherein the test sample coated wire exhibits a tensile stress at break of 10 to 25 megapascals, measured at 23° C. according to UL1581, Section 470, and a tensile elongation at break of 150 to 300 percent, measured at 23° C. according to UL1581, Section 470. It will be understood that the configuration and dimension of the coated wire claimed are not limited to those of the test sample coated wire for which property values are specified. For example, the coated wire can have a conductor with the dimensions specified in UL 1581, Section 20, Table 20.1 for AWG 35 to AWG 10. As another example, the covering disposed on the conductor can have a thickness of 0.2 to 1 millimeter.

One embodiment is a thermoplastic composition, comprising: 20 to 44 weight percent of a poly(arylene ether); 29 to 57 weight percent of total polyolefin; wherein total polyolefin consists of polyolefins and the polyolefin content of block copolymers comprising a poly(alkenyl aromatic) block and a polyolefin block; and 10 to 25 weight percent of a flame retardant composition comprising 1 to 10 weight percent of a metal dialkyl phosphinate; 1 to 17 weight percent of a nitrogen-containing flame retardant selected from the group consisting of melamine phosphate, melamine pyrophosphate, melamine polyphosphates, and mixtures thereof; and 1 to 10 weight percent of a triaryl phosphate that is a liquid at one atmosphere and at least one temperature in the range 25 to 50° C.; wherein all weight percents are based on the total weight of the thermoplastic composition; wherein the poly(arylene ether) and total polyolefin are present in a weight ratio of 0.53:1 to 1.2:1; and wherein the thermoplastic composition exhibits a UL 94 Vertical Burning Flame Test rating of V-0 or V-1 at a sample thickness less than or equal to 6 4 millimeters, a tensile stress at break of at least 5 megapascals, measured at 23° C. according to ASTM D638, and a flexural modulus of 10 to 1,000 megapascals, measured at 23° C. according to ASTM D790.

One embodiment is a thermoplastic composition, comprising: 20 to 50 weight percent of a poly(arylene ether); 25 to 57 weight percent of total polyolefin; wherein total polyolefin consists of polyolefins and the polyolefin content of block copolymers comprising a poly(alkenyl aromatic) block and a polyolefin block; and 6 to 25 weight percent of a flame retardant composition comprising 1 to 15 weight percent of a metal dialkyl phosphinate; and 1 to 20 weight percent of a nitrogen-containing flame retardant selected from the group consisting of melamine phosphate, melamine pyrophosphate, melamine polyphosphates, and mixtures thereof; wherein the flame retardant composition excludes triaryl phosphates that are liquids at one atmosphere and at least one temperature in the range 25 to 50° C.; wherein all weight percents are based on the total weight of the thermoplastic composition; wherein the poly(arylene ether) and total polyolefin are present in a weight ratio of 0.68:1 to 1.2:1; wherein the metal dialkyl phosphinate and the nitrogen-containing flame retardant are present in a weight ratio of at least 5:1; and wherein the thermoplastic composition exhibits a UL 94 Vertical Burning Flame Test rating of V-0 or V-1 at a sample thickness less than or equal to 6 4 millimeters, a tensile stress at break of at least 5 megapascals measured at 23° C. according to ASTM D638, and a flexural modulus of 10 to 1,000 megapascals measured at 23° C. according to ASTM D790.

In some embodiments, the UL 94 Vertical Burning Flame Test is conducted at a sample thickness of 3.0 to 6 4 millimeters, and the tensile stress at break is 5 to 21 megapascals, specifically 8 to 20 megapascals, more specifically 10 to 20 megapascals, still more specifically 12 to 20 megapascals. In some embodiment, the thermoplastic composition exhibits a UL 94 Vertical Burning Flame Test rating of V-0 or V-1 at a sample thickness of 3.0 millimeters. In some embodiments, the thermoplastic composition exhibits a UL 94 Vertical Burning Flame Test rating of V-0 at a sample thickness of 3.0 millimeters. In some embodiments, the thermoplastic composition exhibits an average flame-out time less than or equal to 20 seconds, specifically 4 to 20 seconds, more specifically 5 to 20 seconds. In some embodiments, the thermoplastic composition exhibits a tensile elongation at break of at least 50 percent, specifically 50 to 200 percent, more specifically 100 to 200 percent, still more specifically 150 to 200 percent, measured at 23° C. according to ASTM D638. In some embodiments, the thermoplastic composition exhibits a Shore A hardness of 70 to 95, specifically 75 to 95, measured at 25° C. according to ASTM D 2240 using a Rex Model DD-3-A digital durometer with OS-2H operating stand.

In some embodiments, the thermoplastic composition comprises 30 to 36 weight percent of the poly(arylene ether); the poly(arylene ether) is a poly(2,6-dimethyl-1,4-phenylene ether) having an intrinsic viscosity of 0.3 to 0.6 deciliter per gram measured in chloroform at 25° C.; the thermoplastic composition comprises 38 to 46 weight percent of total polyolefin weight percent of total polyolefin; the total polyolefin comprises polypropylene, ethylene-propylene copolymer, and a poly(ethylene-co-butylene) block of a block copolymer comprising a polystyrene block and a poly(ethylene-co-butylene) block; the thermoplastic composition comprises 10 to 14 weight percent of the flame retardant composition consisting of 1 to 3 weight percent of aluminum tris(diethyl phosphinate), 1 to 3 weight percent of melamine polyphosphate, and 6 to 10 weight percent of bisphenol A bis(diphenyl phosphate); wherein the poly(arylene ether) and total polyolefin are present in a weight ratio of 0.6 to 0.9; and wherein the thermoplastic composition exhibits a UL 94 Vertical Burning Flame Test rating of V-0 or V-1 at a sample thickness of 6.4 millimeters, a tensile stress at break of 12 to 21 megapascals, measured at 23° C. according to ASTM D638, and a flexural modulus of 50 to 310 megapascals, measured at 23° C. according to ASTM D790.

The invention is further illustrated by the following non-limiting examples.

Examples 1-30

Comparative Examples 1-3

These examples illustrate the preparation and testing of compositions in which the flame retardant composition comprises a metal dialkyl phosphinate, a nitrogen-containing flame retardant, and a triaryl phosphate. Components used to form the melt-blended thermoplastic compositions are described in Table 1.

TABLE 1

| Material | Description |
|---|---|
| PPE 0.46 | Poly(2,6-dimethyl-1,4-phenylene ether), CAS Reg. No. 25134-01-4, having an intrinsic viscosity of 0.46 deciliter per gram measured in chloroform at 25° C.; obtained as PPO 646 from GE Plastics |
| POE I | Copolymer of ethylene and 1-octene, CAS Reg. No. 26221-73-8, having a melt flow rate of about 1.1 decigrams per minute measured according to ISO 1133 at 190° C. and a load of 2.16 kilograms; obtained as EXACT 8201 from ExxonMobil Chemical |
| POE II | Copolymer of ethylene and 1-octene, CAS Reg. No. 26221-73-8, having a melt flow rate of about 1.0 decigrams per minute measured according to ISO 1133 at 190° C. and a load of 2.16 kilograms; obtained as EXACT 8210 from ExxonMobil Chemical |
| POE III | Copolymer of ethylene and 1-octene, CAS Reg. No. 26221-73-8, having a melt flow rate of 30 decigrams per minute measured according to ASTM D1238 at 190° C. and a load of 2.16 kilograms; obtained as ENGAGE 8401 from Dow Chemical Co. |
| LLDPE | Linear low density polyethylene (copolymer of ethylene and 1-butene), CAS Reg. No. 25087-34-7; obtained as NUCG-5381 from Nippon Unicar Co. Ltd |
| PP | Polypropylene, CAS Reg. No. 9003-07-0, having a melt flow rate of 8 decigrams per minute measured according to ISO 1133 at 190° C. and a load of 2.16 kilograms; obtained as J-700GP from Prime Polymer Co., Ltd. |
| TPE | Thermoplastic elastomers containing poly(styrene-ethylene/butylene-styrene) triblock copolymer (CAS Reg. No. 66070-58-4), poly(styrene-ethylene/propylene-styrene) triblock copolymer (CAS Reg. No. 68648-89-5), propylene homopolymer (CAS Reg. No. 9003-07-0), ethylene-propylene copolymer (CAS. Reg. No. 9010-79-1), mineral oil (CAS Reg. No. 72623-83-7), and calcium carbonate (CAS Reg. No. 471-34-1); obtained as Sumitomo TPE-SB 2400 from Sumitomo Chemical Col, Ltd. |
| SEBS I | Poly(styrene-ethylene/butylene-styrene) triblock copolymer, CAS Reg. No. 66070-58-4, having a polystyrene content of 40 weight percent, obtained as Kraton RP6936 from Kraton Polymers Ltd. |
| SEBS II | Poly(styrene-ethylene/butylene-styrene) triblock copolymer, CAS Reg. No. 66070-58-4, having a polystyrene content of 30%; obtained as Kraton G1650 from Kraton Polymers Ltd. |
| SEBS III | Poly(styrene-ethylene/butylene-styrene) triblock copolymer, CAS Reg. No. 66070-58-4, having a polystyrene content of 13%; obtained as Kraton G1657 from Kraton Polymers Ltd. |
| Polybutene | Polybutene, CAS Reg. No. 9003-29-6, having a number average molecular weight of 800 grams per mole, a polydispersity index of 1.60; obtained as Indopol H-50 from BP Chemical. |

TABLE 1-continued

| Material | Description |
|---|---|
| Mg(OH)$_2$ | Magnesium hydroxide, CAS Reg. No. 1309-42-8; obtained as Kisuma 5a from Kyowa Chemical |
| MPP | Melamine polyphosphate; obtained as Budit 3141 from Budenheim Iberica, S.A., or as Melapur 200/70 (CAS Reg. No. 218768-84-4) from Ciba Specialty Co. Ltd. |
| FR blend | A flame retardant blend of about 62 weight percent aluminum tris(diethyl phosphinate), CAS Reg. No. 225789-38-8, about 35 weight percent melamine polyphosphate, and 3 weight percent zinc borate; obtained as OP 1312 from Clariant |
| DEPAL | Aluminum tris(diethyl phosphinate), CAS Reg. No. 225789-38-8; obtained as OP 930 or OP 1230 from Clariant |
| BPADP | Bisphenol A bis(diphenyl phosphate), CAS Reg. No. 181028-79-5; obtained as Fyrolflex BDP from Supresta LLC. or Reofos BAPP from Great Lakes Chemical Co. Ltd. |
| RBDMPP | Resorcinol bis(di-2,6-dimethylphenyl phosphate), CAS Reg. No. 139189-30-3; obtained as PX-200 from Daihachi Chemical Industry Co., Ltd. |
| ZB | Zinc borate hydrate, CAS Reg. No. 138265-88-0; obtained as Firebrake ZB from U.S. Borax Inc. |
| CB | Carbon black (pigment); obtained as Channel Black from Heritage |

Specific compositions are detailed in Table 4, where component amounts are expressed in parts by weight except where specified as weight percent, in which case the weight percent values are based on the total weight of the thermoplastic composition. In Table 4, "wt % PO" refers to the weight percent of total equivalent polyolefin. Total equivalent polyolefin is the sum of copolymers of ethylene and 1-octene, polypropylene, polybutene, ethylene/butylene blocks and ethylene/propylene blocks and propylene homopolymer and ethylene-propylene copolymer contributed by the thermoplastic elastomer, and ethylene-butylene blocks contributed by the poly(styrene-ethylene/butylene-styrene) triblock copolymers. Also in Table 4, "PPE:PO" refers to the weight ratio of poly(arylene ether) to total equivalent polyolefin, "% Liquid FR" refers to the weight percent of liquid triaryl phosphate based on the total weight of flame retardant, and "NFR: MDAP" refers to the weight ratio of nitrogen-containing flame retardant to metal dialkyl phosphinate.

Compositions were blended on a 37-millimeter inner diameter twin-screw extruder with twelve zones. The extruder was operated at a screw rotation rate of 450 rotations per minute with temperatures of 225° C. in zone 1, 245° C. in zones 2-12, and 255° C. at the die. All components were added at the feed throat except for liquid triaryl phosphate flame retardants, which were added via injection in zone 2.

The "composition properties" in Table 4 were determined as follows. Test articles were injection molded using a barrel temperature of 250° C. and a mold temperature of 40° C. Flammability was determined using the UL 94 Vertical Burning Flame Test using a sample thickness of 3.0 or 6.4 millimeters. Tensile stress at break and tensile elongation were measured at 23° C. according to ASTM D638. Flexural modulus was measured at 23° C. according to ASTM D790.

The "wire properties" in Table 4 were determined as follows. Test sample coated wires were prepared using the extrusion coating parameters shown in Table 2.

TABLE 2

| Wire Coating Extrusion Parameters | Typical Value | Units |
|---|---|---|
| Drying Temperature | 60-85 | ° C. |
| Drying Time | 12 | hours |
| Maximum Moisture Content | 0.02 | % |
| Extruder Length/Diameter Ratio (L/D) | 22:1 to 26:1 | — |

TABLE 2-continued

| Wire Coating Extrusion Parameters | Typical Value | Units |
|---|---|---|
| Screw speed | 15-85 | rpm |
| Feed Zone Temperature | 180-250 | °C. |
| Middle Zone Temperature | 220-270 | °C. |
| Head Zone Temperature | 220-270 | °C. |
| Neck Temperature | 220-270 | °C. |
| Cross-head Temperature | 220-270 | °C. |
| Die Temperature | 220-270 | °C. |
| Melt Temperature | 220-270 | °C. |
| Conductor Pre-heat Temperature | 25-150 | °C. |
| Screen Pack | 150-100 | μm |
| Cooling Water Air Gap | 100-200 | mm |
| Water Bath Temperature | 15-80 | °C. |

The flame retardancy rating "UL1581 VW-1 rating" and the flame out time "VW1, FOT (sec)" were measured according to UL 1581, Section 1080 (VW-1 Vertical Specimen). Tensile stress at break, expressed in megapascals, and tensile elongation at break, expressed in percent, were measured at 23° C. according to UL1581, Section 470.

Migration of the triaryl phosphate flame retardant to the surface of the test sample wire, and transfer from the surface to poly(acrylonitrile-butadiene-styrene) (ABS), "Migration to ABS", was conducted by contacting a test sample wire with an ABS plaque at 60° C. and 500 gram load for 48 hours, then removing the test wire from the ABS plaque and visually observing for marks left by the wire. Based on the visual observations, a rating of 0 to 5 was assigned, with a rating of 0 corresponding to no marking, a rating of 1 corresponding to very slight marking, a rating of 2 corresponding to slight marking, a rating of 3 corresponding to modest marking and referenced to the composition designated Reference 1 in Table 3, a rating of 4 corresponding to extensive marking, and a rating of 5 corresponding to the severe marking and referenced to the composition designated Reference 2 in Table 3.

In Table 3, all component amounts are in parts by weight, "RDP" refers to resorcinol bis(diphenyl phosphate), and "MP" refers to melamine phosphate.

TABLE 3

|  | Ref. 1 | Ref. 2 |
|---|---|---|
| PPE 0.46 | 30.50 | 23.00 |
| SEBS I | 22.00 | 24.00 |
| TPE | 15.50 | 19.00 |
| MPP | 5.00 | 5.00 |
| Mg(OH)$_2$ | 6.00 | 4.00 |
| MP | 5.00 | — |
| Polybutene | 7.00 | 9.00 |
| RDP | 9.00 | — |
| BPADP | — | 16.00 |

TABLE 4

|  | Ex. 1 | Ex. 2 | Ex. 3 | Ex. 4 | Ex. 5 | Ex. 6 | Ex. 7 |
|---|---|---|---|---|---|---|---|
| COMPOSITIONS | | | | | | | |
| PPE | 31.05 | 31.5 | 31.0 | 32.0 | 32.0 | 32.0 | 30.0 |
| POE I | — | — | — | — | — | — | — |
| POE II | — | — | — | — | — | — | — |
| POE III | — | — | — | — | — | — | — |
| PP | — | — | — | — | — | — | — |
| TPE | 15.5 | 15.5 | 15.5 | 15.5 | — | — | — |
| Polybutene | 7 | 7 | 7 | 7 | 7 | 7 | 6 |
| SEBS I | 22 | 22 | 22 | 22 | 22 | 22 | 25 |
| SEBS II | — | — | — | — | 15.5 | 18.5 | 18 |
| SEBS III | — | — | — | — | — | — | — |
| Mg(OH)$_2$ | — | — | — | — | — | — | — |
| MPP | 15.0 | 12.0 | 12.0 | 11.0 | 11.0 | 12.0 | 9.0 |
| FR blend | 5.0 | 7.0 | 8.0 | 7.0 | 7.0 | — | 7.0 |
| DEPAL | — | — | — | — | — | 4.0 | — |
| BPADP | 4.0 | 4.0 | 4.0 | 5.0 | 5.0 | 4.0 | 4.0 |
| RBDMPP | — | — | — | — | — | — | — |
| ZB | — | — | — | — | — | — | — |
| total all components | 99.5 | 99.0 | 99.5 | 99.5 | 99.5 | 99.5 | 99.0 |
| wt % PO | 34.2 | 34.4 | 34.2 | 34.2 | 31.2 | 33.3 | 33.9 |
| wt % PPE | 31.2 | 31.8 | 31.2 | 32.2 | 32.2 | 32.2 | 30.3 |
| PPE:PO | 0.91 | 0.92 | 0.91 | 0.94 | 1.03 | 0.97 | 0.89 |
| % Liquid FR | 16.6 | 17.2 | 16.6 | 21.6 | 21.6 | 19.9 | 19.8 |
| NFR:MDAP | 5.15 | 3.18 | 2.85 | 2.96 | 2.96 | 3.00 | 3.52 |
| COMPOSITION PROPERTIES | | | | | | | |
| Shore A hardness | — | 78 | 77.9 | 78.2 | 88.4 | 88.2 | 86.4 |
| Flexural modulus (MPa) | 77.8 | 19.2 | 18.6 | 19.7 | 80.5 | 129 | 75.4 |
| Tensile stress at break (MPa) | 10.4 | 10.1 | 10 | 10.6 | 12.7 | 15.5 | 14.4 |
| Tensile elongation (%) | 160 | 200 | 200 | 200 | 100 | 100 | 100 |
| UL 94 rating at 3 mm | V1 | V0 | V0 | V0 | V0 | V0 | V0 |
| FOT at 3 mm (sec) | 9.4 | 5.47 | 4.66 | 6.67 | 5.59 | 4.8 | 5.47 |
| UL 94 rating at 6.4 mm | — | — | — | — | — | — | — |
| FOT at 6.4 mm (sec) | — | — | — | — | — | — | — |
| WIRE PROPERTIES | | | | | | | |
| UL1581 VW-1 rating | — | Pass | Pass | Pass | Pass | Pass | Pass |
| Tensile stress at break (MPa) | — | 16.4 | 15.7 | 17 | 22.8 | 26.9 | 25.1 |
| Tensile elongation (%) | — | 179 | 185 | 173 | 187 | 240 | 218 |
| Migration to ABS | — | 1 | 1 | 1 | 1 | 1 | 1 |
| Heat deformation at 121° C./250 g (%) | — | — | 13 | — | 7 | 6 | — |

TABLE 4-continued

|  | Ex. 8 | Ex. 9 | Ex. 10 | Ex. 11 | C. Ex. 1 | C. Ex. 2 | Ex. 12 |
|---|---|---|---|---|---|---|---|
| COMPOSITIONS |||||||||
| PPE | 32.0 | 31.0 | 32.0 | 32.0 | 32.0 | 32.0 | 32.0 |
| POE I | — | — | — | — | — | — | — |
| POE II | — | — | — | — | — | — | — |
| POE III | — | — | — | — | — | — | — |
| PP | — | — | — | — | — | — | — |
| TPE | 15.5 | 15.5 | 15.5 | 15.5 | 15.5 | — | 15.5 |
| Polybutene | 7 | 7 | 7 | 7 | 7 | 5 | 7 |
| SEBS I | 22 | 22 | 24 | 22 | 24 | 25 | 22 |
| SEBS II | — | — | — | — | — | 18 | — |
| SEBS III | — | — | — | — | — | — | — |
| Mg(OH)$_2$ | — | — | — | — | — | — | — |
| MPP | 9.0 | 10.0 | 10.0 | 10.0 | 10.0 | 9.0 | 11.0 |
| FR blend | 9.0 | 10.0 | 5.0 | 5.0 | 2.0 | 2.0 | 5.0 |
| DEPAL | — | — | — | — | — | — | — |
| BPADP | 4.0 | 4.0 | — | — | — | — | 5.0 |
| RBDMPP | — | — | 5.0 | 5.0 | 8.0 | 8.0 | — |
| ZB | — | — | — | 2.0 | — | — | — |
| total all components | 98.5 | 99.5 | 98.5 | 98.5 | 98.5 | 99.0 | 97.5 |
| wt % PO | 34.6 | 34.2 | 34.6 | 35.8 | 34.6 | 35.8 | 32.9 |
| wt % PPE | 32.5 | 31.2 | 32.5 | 32.5 | 32.5 | 32.5 | 32.3 |
| PPE:PO | 0.94 | 0.91 | 0.91 | 0.94 | 0.91 | 0.98 | 0.94 |
| % Liquid FR | 17.9 | 16.6 | — | — | — | — | 23.2 |
| NFR:MDAP | 2.08 | 2.08 | 2.08 | 2.08 | 3.62 | 8.23 | 3.92 |
| COMPOSITION PROPERTIES |||||||||
| Shore A hardness | 76 | — | 77.9 | 76.3 | 75.2 | 89.4 | 77.3 |
| Flexural modulus (MPa) | 11.7 | 126 | 11.9 | 14.7 | 8.46 | 147 | 15.9 |
| Tensile stress at break (MPa) | 8.06 | 9.4 | 11 | 10.8 | 12 | 17.2 | 9.5 |
| Tensile elongation (%) | 200 | 150 | 170 | 160 | 160 | 83 | 170 |
| UL 94 rating at 3 mm | V0 | V1 | V1 | V1 | V1 | V1 | V1 |
| FOT at 3 mm (sec) | 5.68 | 9.4 | 9.3 | 8.8 | 13.1 | 10.0 | 10.8 |
| UL 94 rating at 6.4 mm | — | — | — | — | — | — | — |
| FOT at 6.4 mm (sec) | — | — | — | — | — | — | — |
| WIRE PROPERTIES |||||||||
| UL1581 VW-1 rating | Pass | — | Pass | Pass | — | — | Pass |
| Tensile stress at break (MPa) | 15.4 | — | 19 | 17.1 | — | — | 14.5 |
| Tensile elongation (%) | 198 | — | 210 | 196 | — | — | 183 |
| Migration to ABS | 1 | — | 1 | 1 | — | — | 1 |
| Heat deformation at 121° C./250 g (%) | — | — | — | — | — | — | 21 |

|  | Ex. 13 | Ex. 14 | Ex. 15 | Ex. 16 | C. Ex. 3 | Ex. 17 | Ex. 18 |
|---|---|---|---|---|---|---|---|
| COMPOSITIONS |||||||||
| PPE | 32.0 | 32.0 | 32.0 | 32.0 | 31.0 | 32.0 | 32.0 |
| POE I | — | — | — | — | — | — | — |
| POE II | — | — | — | — | — | — | — |
| POE III | — | — | — | — | — | — | 10.0 |
| PP | — | — | — | — | — | — | — |
| TPE | 15.5 | 15.5 | 15.5 | — | 15.5 | 7.5 | — |
| Polybutene | 7 | 7 | 7 | 7.0 | 7.0 | 7.0 | 7.0 |
| SEBS I | 22 | 22 | 22 | 22.0 | 22.0 | 22.0 | 22.0 |
| SEBS II | — | — | — | 18.5 | — | 10.0 | 8.0 |
| SEBS III | — | — | — | — | — | — | — |
| Mg(OH)$_2$ | — | — | — | — | 6.0 | — | — |
| MPP | 13.0 | 13.0 | 13.0 | 13.0 | 9.0 | 9.0 | 9.0 |
| FR blend | 6.0 | 7.0 | 4.0 | 4.0 | 5.0 | 6.0 | 6.0 |
| DEPAL | — | — | — | — | — | — | — |
| BPADP | 5.0 | 5.0 | 4.0 | 4.0 | 4.0 | 5.0 | 5.0 |
| RBDMPP | — | — | — | — | — | — | — |
| ZB | — | — | 0.2 | — | — | — | — |
| total all components | 100.5 | 101.5 | 97.7 | 100.5 | 99.5 | 101.1 | 99.0 |
| wt % PO | 34.9 | 33.9 | 33.6 | 33.3 | 34.2 | 33.5 | 36.2 |
| wt % PPE | 32.8 | 31.8 | 31.5 | 32.2 | 31.2 | 31.7 | 32.3 |
| PPE:PO | 0.94 | 0.94 | 0.94 | 0.97 | 0.91 | 0.94 | 0.89 |
| % Liquid FR | 20.9 | 20.3 | 18.4 | 19.9 | 16.6 | 25.3 | 24.8 |
| NFR:MDAP | 3.87 | 3.40 | 5.54 | 5.15 | 3.31 | 2.85 | 2.85 |
| COMPOSITION PROPERTIES |||||||||
| Shore A hardness | 77.5 | 77.7 | 77.5 | 92.5 | — | 84.8 | 89 |
| Flexural modulus (MPa) | 16.4 | 16.1 | 16.3 | 306 | 72.8 | 79 | 101 |
| Tensile stress at break (MPa) | 9.82 | 10 | 9.78 | 13 | 8.6 | 12.5 | 16.7 |

TABLE 4-continued

|  | | | | | | | |
|---|---|---|---|---|---|---|---|
| Tensile elongation (%) | 170 | 170 | 180 | 49 | 120 | 81 | 114 |
| UL 94 rating at 3 mm | V1 | V1 | V1 | V0 | Fail | V1 | V0 |
| FOT at 3 mm (sec) | 7.2 | 8.1 | 10.2 | 8.1 | 94.3 | 9.45 | 5.50 |
| UL 94 rating at 6.4 mm | — | — | — | — | — | — | — |
| FOT at 6.4 mm (sec) | — | — | — | — | — | — | — |
| WIRE PROPERTIES | | | | | | | |
| UL1581 VW-1 rating | Pass | Pass | Pass | Pass | — | Pass | Pass |
| Tensile stress at break (MPa) | 15.4 | 17.5 | 16.7 | 22.8 | — | 24.7 | 23.8 |
| Tensile elongation (%) | 176 | 188 | 185 | 180 | — | 201 | 210 |
| Migration to ABS | 1 | 1 | 1 | 1 | — | 1 | 1 |
| Heat deformation at 121° C./250 g (%) | 19 | 18 | 17 | 5 | — | 16 | 14 |

| | Ex. 19 | Ex. 20 | Ex. 21 | Ex. 22 | Ex. 23 | Ex. 24 | Ex. 25 |
|---|---|---|---|---|---|---|---|
| COMPOSITIONS | | | | | | | |
| PPE | 28.0 | 32.0 | 32.0 | 32.0 | 32.0 | 36.0 | 33.0 |
| POE I | — | 7.5 | 8.0 | 8.0 | — | — | — |
| POE II | — | — | 7.5 | — | — | — | — |
| POE III | 12.0 | 7.5 | — | — | 8.5 | — | — |
| PP | — | — | — | — | — | — | 8.0 |
| TPE | — | — | — | 7.5 | — | 14.0 | 12.0 |
| Polybutene | 9.0 | 7.0 | 7.0 | 7.0 | 7.0 | 8.0 | 5.0 |
| SEBS I | 29.0 | 23.0 | 22.0 | 22.0 | 23.0 | 30.0 | 30.0 |
| SEBS II | — | — | — | — | — | — | — |
| SEBS III | — | — | — | — | 8.5 | — | — |
| Mg(OH)$_2$ | — | — | — | — | — | — | — |
| MPP | 10.0 | 10.0 | 10.0 | 10.0 | 8.0 | 4.0 | 2.0 |
| FR blend | 6.0 | 7.0 | 7.0 | 7.0 | 7.0 | — | — |
| DEPAL | — | — | — | — | — | 4.0 | 2.0 |
| BPADP | 5.0 | 5.0 | 5.0 | 5.0 | 5.0 | 4.0 | 8.0 |
| RBDMPP | — | — | — | — | — | — | — |
| ZB | — | — | — | — | — | — | — |
| total all components | 99.0 | 99.0 | 98.5 | 98.5 | 99.0 | 100.0 | 100.0 |
| wt % PO | 38.8 | 36.2 | 36.2 | 35.4 | 29.6 | 38.5 | 41.7 |
| wt % PPE | 28.3 | 32.3 | 32.5 | 32.5 | 32.3 | 36.0 | 33.0 |
| PPE:PO | 0.73 | 0.89 | 0.90 | 0.92 | 1.09 | 0.93 | 0.79 |
| % Liquid FR | 23.6 | 22.5 | 22.4 | 22.4 | 24.8 | 33.3 | 66.7 |
| NFR:MDAP | 3.10 | 2.74 | 2.74 | 2.74 | 2.30 | 1.00 | 1.00 |
| COMPOSITION PROPERTIES | | | | | | | |
| Shore A hardness | 82.7 | 88 | 87 | 84.9 | 81.7 | — | 88.7 |
| Flexural modulus (MPa) | 32 | 44 | 37.3 | 44.9 | 23 | 15.1 | 104 |
| Tensile stress at break (MPa) | 13 | 12.4 | 11.9 | 12.8 | 11.6 | 13 | 19.5 |
| Tensile elongation (%) | 196 | 115 | 152.3 | 106.1 | 196 | 193 | 164 |
| UL 94 rating at 3 mm | V0 | V0 | V0 | V0 | V1 | V1 | Fail |
| FOT at 3 mm (sec) | 5.50 | 5.30 | 5.20 | 8.31 | 20.8 | 8.93 | 24 |
| UL 94 rating at 6.4 mm | — | — | — | — | — | V0 | V1 |
| FOT at 6.4 mm (sec) | — | — | — | — | — | 5.7 | 16.0 |
| WIRE PROPERTIES | | | | | | | |
| UL1581 VW-1 rating | Pass | Pass | Pass | Pass | Pass | Pass | Pass |
| Tensile stress at break (MPa) | 21.1 | 20.3 | 18.1 | 20.3 | 18.8 | 22.4 | 28.8 |
| Tensile elongation (%) | 226 | 182 | 183 | 177 | 218 | 209 | 220 |
| Migration to ABS | 1 | 2 | 1 | 1 | 1 | 1 | — |
| Heat deformation at 121° C./250 g (%) | 23 | 20 | 23 | 20 | 27 | 24.3 | 14.4 |

| | Ex. 26 | Ex. 27 | Ex. 28 | Ex. 29 | Ex. 30 |
|---|---|---|---|---|---|
| COMPOSITIONS | | | | | |
| PPE | 34.0 | 34.0 | 33.0 | 34.0 | 32.0 |
| POE I | — | — | — | — | — |
| POE II | — | — | — | — | — |
| POE III | — | — | 12.0 | — | 12.0 |
| PP | 8.0 | 8.0 | — | 8.0 | — |
| TPE | 10.0 | 8.0 | — | 8.0 | — |
| Polybutene | 5.0 | 5.0 | 8.0 | 5.0 | 8.0 |
| SEBS I | 30.0 | 28.0 | 27.0 | 28.0 | 27.0 |
| SEBS II | — | 4.0 | 3.0 | 4.0 | 3.0 |
| SEBS III | — | — | — | — | — |
| Mg(OH)$_2$ | — | — | — | — | — |
| MPP | 4.0 | 4.0 | 8.0 | 4.0 | 9.0 |
| FR blend | — | — | — | — | — |
| DEPAL | 4.0 | 4.0 | 5.0 | 4.0 | 5.0 |
| BPADP | 5.0 | 5.0 | 4.0 | 5.0 | 4.0 |

TABLE 4-continued

| | | | | | |
|---|---|---|---|---|---|
| RBDMPP | — | — | — | — | — |
| ZB | — | — | — | — | — |
| total all components | 100.0 | 100.0 | 100.0 | 100.0 | 100.0 |
| wt % PO | 40.0 | 39.8 | 38.3 | 39.8 | 38.3 |
| wt % PPE | 34.0 | 34.0 | 33.0 | 34.0 | 32.0 |
| PPE:PO | 0.85 | 0.86 | 0.86 | 0.86 | 0.84 |
| % Liquid FR | 38.5 | 38.5 | 23.5 | 38.5 | 22.2 |
| NFR:MDAP | 1.00 | 1.00 | 1.60 | 1.00 | 1.80 |
| COMPOSITION PROPERTIES | | | | | |
| Shore A hardness | 88.2 | 87.9 | 82.7 | 88.3 | 83.5 |
| Flexural modulus (MPa) | 74 | 103.0 | 31.5 | 103.0 | 31.5 |
| Tensile stress at break (MPa) | 18.5 | 20.3 | 13.4 | 19.9 | 13.5 |
| Tensile elongation (%) | 153 | 155.5 | 174.6 | 146.5 | 170.4 |
| UL 94 rating at 3 mm | Fail | Fail | V1 | — | — |
| FOT at 3 mm (sec) | 24 | 19.34 | 15.18 | — | — |
| UL 94 rating at 6.4 mm | Fail | Fail | Fail | V0 at 5.0 mm | V0 at 5.0 mm |
| FOT at 6.4 mm (sec) | 16.0 | 6.29 | 13.47 | 3.8 | 3.1 |
| WIRE PROPERTIES | | | | | |
| UL1581 VW-1 rating | Pass | Pass | Pass | Pass | Pass |
| Tensile stress at break (MPa) | 25.8 | 25.4 | 18.4 | 27 | 17.6 |
| Tensile elongation (%) | 208 | 192 | 192 | 194 | 197 |
| Migration to ABS | 1 | 1 | 1 | 1 | 1 |
| Heat deformation at 121° C./250 g (%) | 11.2 | 9.4 | 10.5 | 8.7 | 28.4 |

Examples 31-50

Comparative Examples 4-10

These examples illustrate the preparation and testing of compositions in which the flame retardant composition comprises a metal dialkyl phosphinate, and a nitrogen-containing flame retardant, but excludes triaryl phosphate flame retardant. Preparation and test procedures are the same as those described above.

Specific compositions are detailed in Table 5, where component amounts are expressed in parts by weight except where specified as weight percent, in which case the weight percent values are based on the total weight of the thermoplastic composition.

TABLE 5

| | Ex. 31 | Ex. 32 | Ex. 33 | Ex. 34 | Ex. 35 | Ex. 36 | C. Ex. 4 |
|---|---|---|---|---|---|---|---|
| COMPOSITIONS | | | | | | | |
| PPE | 30 | 30 | 30 | 30 | 30 | 30 | 30 |
| POE I | 16 | 19 | 22 | 19 | 19 | 23 | 24 |
| POE II | 16 | 19 | 22 | 19 | 19 | 23 | 24 |
| POE III | — | — | — | — | — | — | — |
| LLDPE | — | — | — | — | — | — | — |
| PP | — | — | — | — | — | — | — |
| Polybutene | — | — | — | — | — | — | — |
| TPE | — | — | — | — | — | — | — |
| SEBS I | — | — | — | — | — | — | — |
| SEBS II | 10 | 10 | 10 | 10 | 10 | 10 | 10 |
| SEBS III | — | — | — | — | — | — | — |
| MPP | 14 | 11 | 8 | 5.5 | 16.5 | 7 | 6 |
| DEPAL | 14 | 11 | 8 | 16.5 | 5.5 | 7 | 6 |
| FR Blend | — | — | — | — | — | — | — |
| ZB | — | — | — | — | — | — | — |
| total all components | 100 | 100 | 100 | 100 | 100 | 100 | 100 |
| wt % PO | 39.0 | 45.0 | 51.0 | 45.0 | 45.0 | 53.0 | 55.0 |
| wt % PPE | 30.0 | 30.0 | 30.0 | 30.0 | 30.0 | 30.0 | 30.0 |
| PPE:PO | 0.77 | 0.67 | 0.59 | 0.67 | 0.67 | 0.57 | 0.55 |
| NFR:MDAP | 1.00 | 1.00 | 1.00 | 0.33 | 3.00 | 1.00 | 1.00 |
| COMPOSITION PROPERTIES | | | | | | | |
| Shore A hardness | 94.6 | 92.4 | 90.8 | 92.6 | 92.9 | 89.6 | 89.6 |
| Flexural modulus (MPa) | 221 | 112 | 71 | 85 | 151 | 54 | 48.7 |
| Tensile stress at break (MPa) | 11.4 | 13.2 | 14.7 | 13 | 12.7 | 15.3 | 15.8 |
| Tensile elongation (%) | 160 | 280 | 360 | 260 | 280 | 416 | 435 |
| UL 94 rating at 3 mm | V0 | V0 | Fail | V1 | V1 | Fail | Fail |
| FOT at 3 mm (sec) | 5.0 | 6.5 | 48.9 | 9.4 | 8.9 | 63 | 86 |
| UL 94 rating at 6.4 mm | V0 | V0 | V0 | V0 | V0 | Fail | Fail |
| FOT at 6.4 mm (sec) | 3.0 | 2.4 | 4.5 | 3.7 | 3.7 | 68 | 95 |

TABLE 5-continued

| WIRE PROPERTIES | | | | | | | |
|---|---|---|---|---|---|---|---|
| UL1581 VW-1 rating | Pass | Pass | Pass | Pass | Pass | Pass | Fail |
| Tensile stress at break (MPa) | 17 | 18.1 | 20.9 | 19.2 | 19.5 | 20.6 | 21 |
| Tensile elongation (%) | 187 | 240 | 299 | 232 | 258 | 340 | 348 |
| Heat deformation at 121° C./250 g (%) | — | — | — | — | — | — | — |

| | Ex. 37 | Ex. 38 | Ex. 49 | Ex. 40 | Ex. 41. | Ex. 42 | Ex. 43 |
|---|---|---|---|---|---|---|---|
| COMPOSITIONS | | | | | | | |
| PPE | 30 | 30 | 28.0 | 36.0 | 40.0 | 42.0 | 40.0 |
| POE I | 22 | 22 | — | — | — | — | — |
| POE II | 22 | 22 | — | — | — | — | — |
| POE III | — | — | — | — | — | — | 6.0 |
| LLDPE | — | — | — | — | — | — | — |
| PP | — | — | — | — | — | — | — |
| Polybutene | — | — | 8.0 | 8.0 | 8.0 | 8.0 | 6.0 |
| TPE | — | — | 13.5 | 12.0 | 14.0 | 14.0 | 10.0 |
| SEBS I | — | — | 20.0 | 20.0 | 30.0 | 30.0 | 30.0 |
| SEBS II | 10 | 10 | — | — | — | — | — |
| SEBS III | — | — | 10.5 | 12.0 | — | — | — |
| MPP | 12 | 4 | 10.0 | 6.0 | 4.0 | 3.0 | 4.0 |
| DEPAL | 4 | 12 | 10.0 | 6.0 | 4.0 | 3.0 | 4.0 |
| FR Blend | — | — | — | — | — | — | — |
| ZB | — | — | — | — | — | — | — |
| total all components | 100 | 100 | 100 | 100 | 100 | 100 | 100 |
| wt % PO | 45.0 | 45.0 | 41.2 | 41.2 | 38.5 | 38.5 | 39.0 |
| wt % PPE | 30.0 | 30.0 | 28.0 | 36.0 | 40.0 | 42.0 | 40.0 |
| PPE:PO | 0.67 | 0.67 | 0.68 | 0.87 | 1.04 | 1.09 | 1.03 |
| NFR:MDAP | 3.00 | 0.33 | 1.00 | 1.00 | 1.00 | 1.00 | 1.00 |
| COMPOSITION PROPERTIES | | | | | | | |
| Shore A hardness | 90 | 90.8 | 66.3 | 71.7 | — | — | — |
| Flexural modulus (MPa) | 52.9 | 68.8 | 5.98 | 10.3 | 13.3 | 14.3 | 19.3 |
| Tensile stress at break (MPa) | 14.4 | 13.8 | 8 | 12.1 | 12.9 | 12.6 | 14.4 |
| Tensile elongation (%) | 360 | 353 | 320 | 263 | 227 | 229 | 224 |
| UL 94 rating at 3 mm | Fail | Fail | V1 | V1 | Fail | Fail | Fail |
| FOT at 3 mm (sec) | 32 | 68 | 6.0 | 8.3 | 24.0 | 31.3 | 26.0 |
| UL 94 rating at 6.4 mm | Fail | Fail | — | V0 | V0 | V1 | V0 |
| FOT at 6.4 mm (sec) | 20 | 58 | — | 3.3 | 7.3 | 18 | 5.5 |
| WIRE PROPERTIES | | | | | | | |
| UL1581 VW-1 rating | Pass | Pass | Pass | Pass | Pass | Pass | Pass |
| Tensile stress at break (MPa) | 19.6 | 21.7 | 11.8 | 17.7 | 21.8 | 22.5 | 22.9 |
| Tensile elongation (%) | 315 | 297 | 276 | 264 | 242 | 240 | 231 |
| Heat deformation at 121° C./250 g (%) | — | — | 47 | 32 | 16.9 | 15.0 | 16.9 |

| | Ex. 44 | Ex. 45 | C. Ex. 5 | Ex. 46 | Ex. 47 | Ex. 48 |
|---|---|---|---|---|---|---|
| COMPOSITIONS | | | | | | |
| PPE | 36.0 | 44.0 | 46.0 | 44.0 | 34.0 | 32.0 |
| POE I | — | — | — | — | — | — |
| POE II | — | — | — | — | — | — |
| POE III | — | — | — | — | — | — |
| LLDPE | — | — | — | — | — | — |
| PP | — | — | — | — | 5.0 | — |
| Polybutene | 8.0 | 8.0 | 8.0 | 8.0 | 7.0 | 7.0 |
| TPE | 12.0 | 14.0 | 14.0 | 14.0 | 11.0 | 15.5 |
| SEBS I | 20.0 | 30.0 | 30.0 | 30.0 | 24.5 | 22.0 |
| SEBS II | — | — | — | — | — | — |
| SEBS III | 12.0 | — | — | — | 8.0 | — |
| MPP | 6.0 | 2.0 | 1.0 | 2.0 | 6.0 | 10.0 |
| DEPAL | 6.0 | 2.0 | 1.0 | 2.0 | 4.5 | — |
| FR Blend | — | — | — | — | — | 10.0 |
| ZB | — | — | — | — | — | 2.0 |
| total all components | 100 | 100 | 100 | 100 | 100 | 98.5 |
| wt % PO | 41.2 | 38.5 | 38.5 | 38.5 | 38.5 | 34.6 |
| wt % PPE | 36.0 | 44.0 | 46.0 | 44.0 | 46.0 | 32.5 |
| PPE:PO | 0.87 | 1.14 | 1.19 | 1.14 | 1.19 | 0.94 |
| NFR:MDAP | 1.00 | 1.00 | 1.00 | 1.00 | 1.00 | 2.08 |
| COMPOSITION PROPERTIES | | | | | | |
| Shore A hardness | 71.7 | 78.5 | 78.9 | 78.4 | 77 | 77.6 |
| Flexural modulus (MPa) | 10.3 | 12.9 | 12.2 | 12.1 | 19 | 15 |

TABLE 5-continued

| | | | | | | |
|---|---|---|---|---|---|---|
| Tensile stress at break (MPa) | 12.1 | 13.2 | 12.3 | 12 | 15.4 | 10 |
| Tensile elongation (%) | 263 | 239 | 182 | 180 | 304 | 200 |
| UL 94 rating at 3 mm | V1 | Fail | Fail | Fail | V1 | V1 |
| FOT at 3 mm (sec) | 8.3 | 60 | — | — | 20 | 12.2 |
| UL 94 rating at 6.4 mm | V0 | Fail | Fail | Fail | V0 | — |
| FOT at 6.4 mm (sec) | 3.3 | 22.4 | — | — | 6.5 | — |
| WIRE PROPERTIES | | | | | | |
| UL1581 VW-1 rating | Pass | Pass | Fail | Pass | Pass | Pass |
| Tensile stress at break (MPa) | 17.7 | 22.2 | 25.3 | 24.5 | 20.6 | 17.2 |
| Tensile elongation (%) | 264 | 239 | 252 | 238 | 273 | 218 |
| Heat deformation at 121° C./250 g (%) | 32 | 13.2 | 10.3 | 12.7 | 13 | 7 |

| | C. Ex. 6 | C. Ex. 7 | C. Ex. 8 | C. Ex. 9 | C. Ex. 10 | Ex. 49 | Ex. 50 |
|---|---|---|---|---|---|---|---|
| COMPOSITIONS | | | | | | | |
| PPE | 32 | 32 | 32 | 32 | 32 | 32 | 32 |
| POE I | — | — | — | — | — | — | — |
| POE II | — | — | — | — | — | — | — |
| POE III | — | — | — | — | — | — | — |
| LLDPE | — | — | — | — | 15.5 | — | — |
| PP | — | — | — | — | — | — | — |
| Polybutene | 5 | 7 | 7 | 7 | 7 | 7 | 7 |
| TPE | — | 15.5 | 15.5 | 15.5 | — | 15.5 | 15.5 |
| SEBS I | 25 | 24 | 24 | 24 | 24 | 24 | 24 |
| SEBS II | 18 | — | — | — | — | — | — |
| SEBS III | — | — | — | — | — | — | — |
| MPP | 15 | 12.5 | 15 | 15 | 15 | 10 | 5 |
| DEPAL | — | — | — | — | — | — | — |
| FR Blend | 2 | 2.5 | 3 | 5 | 5 | 10 | 15 |
| ZB | — | — | — | — | — | — | — |
| total all components | 97.00 | 93.50 | 96.50 | 98.50 | 98.50 | 98.50 | 98.50 |
| wt % PO | 33.6 | 37.7 | 36.6 | 35.8 | 37.5 | 35.8 | 35.8 |
| wt % PPE | 33.0 | 34.2 | 33.2 | 32.5 | 32.5 | 32.5 | 32.5 |
| PPE:PO | 0.98 | 0.91 | 0.91 | 0.91 | 0.87 | 0.91 | 0.91 |
| NFR:MDAP | 12.08 | 8.23 | 8.23 | 5.15 | 5.15 | 2.08 | 1.05 |
| COMPOSITION PROPERTIES | | | | | | | |
| Shore A hardness | 86.4 | 73.2 | 74 | 75.2 | 89.9 | 76.1 | 76.5 |
| Flexural modulus (MPa) | 54.3 | 10 | 9.94 | 8.4 | 52 | 8.32 | 12.6 |
| Tensile stress at break (MPa) | 18.0 | 10.6 | 10 | 11.8 | 9.4 | 10 | 9.96 |
| Tensile elongation (%) | 160 | 200 | 200 | 190 | 140 | 200 | 210 |
| UL 94 rating at 3 mm | Fail | Fail | Fail | V1 | Fail | V1 | V0 |
| FOT at 3 mm (sec) | 90.70 | 66.5 | 74.9 | 10.2 | 41.4 | 8.1 | 6.7 |
| UL 94 rating at 6.4 mm | — | — | — | — | — | — | — |
| FOT at 6.4 mm (sec) | — | — | — | — | — | — | — |
| WIRE PROPERTIES | | | | | | | |
| UL1581 VW-1 rating | — | — | — | Fail | — | Pass | Pass |
| Tensile stress at break (MPa) | — | — | — | 20 | — | 13 | 16.6 |
| Tensile elongation (%) | — | — | — | 183 | — | 187 | 235 |
| Heat deformation at 121° C./250 g (%) | — | — | — | — | — | 20 | — |

Examples 51-58

Comparative Examples 11 and 12

These examples illustrate the preparation and testing of compositions in which the flame retardant composition comprises a metal dialkyl phosphinate, but excludes a nitrogen-containing flame retardant. Preparation and test procedures are the same as those described above.

Specific compositions are detailed in Table 6, where component amounts are expressed in parts by weight except where specified as weight percent, in which case the weight percent values are based on the total weight of the thermoplastic composition.

TABLE 6

| | Ex. 51 | Ex. 52 | Ex. 53 | Ex. 54 | C. Ex. 11 | Ex. 55 | Ex. 56 |
|---|---|---|---|---|---|---|---|
| COMPOSITIONS | | | | | | | |
| PPE | 32 | 30 | 30 | 30 | 30 | 30 | 38 |
| POE I | — | 16 | 19 | 22 | 25 | 25 | — |
| POE II | — | 16 | 19 | 22 | 25 | 25 | — |
| TPE | 15.5 | — | — | — | — | 14 | 14 |
| Polybutene | 7 | — | — | — | — | 8 | 8 |

TABLE 6-continued

|  | | | | | | | |
|---|---|---|---|---|---|---|---|
| SEBS I | 24 | — | — | — | — | 30 | 30 |
| SEBS II | — | 10 | 10 | 10 | 10 | — | — |
| DEPAL | 20 | 28 | 22 | 16 | 10 | 10 | 8 |
| total all components | 98.5 | 100 | 100 | 100 | 100 | 100 | 100 |
| wt % PO | 35.8 | 39.0 | 45.0 | 51.0 | 57.0 | 38.5 | 38.5 |
| wt % PPE | 32.5 | 30.0 | 30.0 | 30.0 | 30.0 | 38.0 | 40.0 |
| PPE/PO | 0.91 | 0.77 | 0.67 | 0.59 | 0.53 | 0.99 | 1.04 |
| COMPOSITION PROPERTIES | | | | | | | |
| Shore A hardness | 79.9 | 94.9 | 92.7 | 91.8 | 89.9 | 75.4 | 77.1 |
| Flexural modulus (MPa) | 29.7 | 240 | 123 | 78.5 | 43.3 | 12.9 | 14.7 |
| Tensile stress at break (MPa) | 9.62 | 11.3 | 13.1 | 14.4 | 15.8 | 12 | 12.4 |
| Tensile elongation (%) | 190 | 180 | 290 | 350 | 447 | 249 | 246 |
| UL 94 rating at 3 mm | V1 | Fail | Fail | Fail | Fail | Fail | Fail |
| FOT at 3 mm (sec) | 14.1 | 35.5 | — | — | — | 23.4 | 29.7 |
| UL 94 rating at 6.4 mm | — | — | Fail | Fail | Fail | Fail | Fail |
| FOT at 6.4 mm (sec) | — | — | — | — | — | 26.4 | 24.6 |
| WIRE PROPERTIES | | | | | | | |
| UL1581 VW-1 rating | Pass | — | Pass | Pass | Fail | Pass | Pass |
| Tensile stress at break (MPa) | 15.8 | — | 20.4 | 21.1 | 20 | 19.7 | 18.8 |
| Tensile elongation (%) | 245 | — | 287 | 304 | 352 | 279 | 232 |
| Heat deformation at 121° C./250 g (%) | 15 | | | | | 19.0 | 15.6 |

|  | Ex. 57 | Ex. 58 | C. Ex. 12 |
|---|---|---|---|
| COMPOSITIONS | | | |
| PPE | 42 | 44 | 46 |
| POE I | — | — | — |
| POE II | — | — | — |
| TPE | 14 | 14 | 14 |
| Polybutene | 8 | 8 | 8 |
| SEBS I | 30 | 30 | 30 |
| SEBS II | — | — | — |
| DEPAL | 6 | 4 | 2 |
| total all components | 100 | 100 | 100 |
| wt % PO | 38.5 | 38.5 | 38.5 |
| wt % PPE | 42.0 | 44.0 | 46.0 |
| PPE/PO | 1.09 | 1.14 | 1.19 |
| COMPOSITION PROPERTIES | | | |
| Shore A hardness | 78.0 | 78.7 | 79.9 |
| Flexural modulus (MPa) | 11.6 | 13.1 | 12.1 |
| Tensile stress at break (MPa) | 12.4 | 11.5 | 11.4 |
| Tensile elongation (%) | 242 | 175 | 168 |
| UL 94 rating at 3 mm | Fail | Fail | Fail |
| FOT at 3 mm (sec) | 58.08 | — | — |
| UL 94 rating at 6.4 mm | Fail | Fail | Fail |
| FOT at 6.4 mm (sec) | 32.21 | — | — |
| WIRE PROPERTIES | | | |
| UL1581 VW-1 rating | Pass | Pass | Fail |
| Tensile stress at break (MPa) | 21.1 | 25 | 24.9 |
| Tensile elongation (%) | 237 | 245 | 240 |
| Heat deformation at 121° C./250 g (%) | 14.3 | 13.4 | 9.8 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A thermoplastic composition, comprising:
   20 to 50 weight percent of a poly(arylene ether);
   25 to 57 weight percent of total polyolefin; wherein total polyolefin consists of polyolefins and the polyolefin content of block copolymers comprising a poly(alkenyl aromatic) block and a polyolefin block; and
   3 to 30 weight percent of a flame retardant composition comprising a metal dialkyl phosphinate;
   wherein all weight percents are based on the total weight of the thermoplastic composition;
   wherein the poly(arylene ether) and total polyolefin are present in a weight ratio of 0.53:1 to 1.2:1; and
   wherein a test sample coated wire exhibits
      a tensile stress at break of at least 10 megapascals, measured at 23° C. according to UL 1581, Section 470,
      a tensile elongation at break of at least 100 percent, measured at 23° C. according to UL 1581, Section 470, and
      a passing flame test rating according to UL 1581, Section 1080,
   wherein the test sample coated wire consists of an AWG 24 conductor having a nominal cross sectional area of 0.205 millimeter$^2$, and a tubular covering comprising the thermoplastic composition and having a nominal outer diameter of 2 millimeters.

2. The thermoplastic composition of claim 1,
   wherein the thermoplastic composition comprises 20 to 44 weight percent of the poly(arylene ether);
   wherein the thermoplastic composition comprises 29 to 57 weight percent of total polyolefin;
   wherein the thermoplastic composition comprises 10 to 25 weight percent of the flame retardant composition;
   wherein the flame retardant composition comprises 1 to 10 weight percent of the metal dialkyl phosphinate; and
   wherein the flame retardant composition further comprises
      1 to 17 weight percent of a nitrogen-containing flame retardant selected from the group consisting of melamine phosphate, melamine pyrophosphate, melamine polyphosphates, and mixtures thereof, and
      1 to 10 weight percent of a triaryl phosphate that is a liquid at one atmosphere and at least one temperature in the range 25 to 50° C.

3. The thermoplastic composition of claim 2, wherein the test sample coated wire exhibits
   a tensile stress at break of 10 to 30 megapascals, measured at 23° C. according to UL1581, Section 470, and
   a tensile elongation at break of 100 to 240 percent, measured at 23° C. according to UL1581, Section 470.

4. The thermoplastic composition of claim 2, wherein the test sample coated wire further exhibits a triaryl phosphate migration rating of 0, 1, or 2, measured as described in the working examples.

5. The thermoplastic composition of claim 2, wherein the test sample coated wire further exhibits a heat deformation of 5 to 40 percent, measured at 121° C. and a 250 gram load according to UL 1581.

6. The thermoplastic composition of claim 2, wherein the liquid triaryl phosphate represents 10 to 70 percent of the total weight of the flame retardant composition.

7. The thermoplastic composition of claim 2, wherein the nitrogen-containing flame retardant and the metal dialkyl phosphinate are present in a weight ratio of 0.5 to 8.

8. The thermoplastic composition of claim 2, wherein the flame retardant composition consists of the metal dialkyl phosphinate, the nitrogen-containing flame retardant, and the liquid triaryl phosphate.

9. The thermoplastic composition of claim 2, wherein the flame retardant composition further comprises 0.05 to 2.5 weight percent zinc borate.

10. The thermoplastic composition of claim 2, further comprising 8 to 20 weight percent of total poly(alkenyl aromatic); wherein total poly(alkenyl aromatic) consists of poly(alkenyl aromatic)s and the poly(alkenyl aromatic) content of block copolymers comprising a poly(alkenyl aromatic) block and a polyolefin block.

11. The thermoplastic composition of claim 2,
   wherein the thermoplastic composition comprises 30 to 36 weight percent of the poly(arylene ether);
   wherein the poly(arylene ether) is a poly(2,6-dimethyl-1,4-phenylene ether) having an intrinsic viscosity of 0.3 to 0.6 deciliter per gram measured in chloroform at 25° C.;
   wherein the thermoplastic composition comprises 38 to 46 weight percent of total polyolefin weight percent of total polyolefin;
   wherein the total polyolefin comprises polypropylene, ethylene-propylene copolymer, a poly(ethylene-co-propylene) block of a block copolymer comprising a polystyrene block and a poly(ethylene-co-propylene) block, and a poly(ethylene-co-butylene) block of a block copolymer comprising a polystyrene block and a poly(ethylene-co-butylene) block;
   wherein the thermoplastic composition comprises 10 to 14 weight percent of the flame retardant composition consisting of
      1 to 3 weight percent of aluminum tris(diethyl phosphinate),
      1 to 3 weight percent of melamine polyphosphate, and
      6 to 10 weight percent of bisphenol A bis(diphenyl phosphate);
   wherein the poly(arylene ether) and total polyolefin are present in a weight ratio of 0.6 to 0.9; and
   wherein the test sample coated wire exhibits
      a tensile stress at break of 10 to 30 megapascals, measured at 23° C. according to UL1581, Section 470, and
      a tensile elongation at break of 100 to 240 percent, measured at 23° C. according to UL1581, Section 470.

12. The thermoplastic composition of claim 2,
   wherein the thermoplastic composition exhibits
      a UL 94 Vertical Burning Flame Test rating of V-0 or V-1 at a sample thickness less than or equal to 6.4 millimeters,
      a tensile stress at break of at least 5 megapascals, measured at 23° C. according to ASTM D638, and
      a flexural modulus of 10 to 1,000 megapascals, measured at 23° C. according to ASTM D790.

13. The thermoplastic composition of claim 12,
   wherein the UL 94 Vertical Burning Flame Test is conducted at a sample thickness of 3.0 to 6.4 millimeters, and
   wherein the tensile stress at break is 5 to 21 megapascals.

14. The thermoplastic composition of claim 2,
   wherein the thermoplastic composition comprises 30 to 36 weight percent of the poly(arylene ether);
   wherein the poly(arylene ether) is a poly(2,6-dimethyl-1,4-phenylene ether) having an intrinsic viscosity of 0.3 to 0.6 deciliter per gram measured in chloroform at 25° C.;

wherein the thermoplastic composition comprises 38 to 46 weight percent of total polyolefin weight percent of total polyolefin;
wherein the total polyolefin comprises polypropylene, ethylene-propylene copolymer, and a poly(ethylene-co-butylene) block of a block copolymer comprising a polystyrene block and a poly(ethylene-co-butylene) block;
wherein the thermoplastic composition comprises 10 to 14 weight percent of the flame retardant composition consisting of
 1 to 3 weight percent of aluminum tris(diethyl phosphinate),
 1 to 3 weight percent of melamine polyphosphate, and
 6 to 10 weight percent of bisphenol A bis(diphenyl phosphate);
wherein the poly(arylene ether) and total polyolefin are present in a weight ratio of 0.6 to 0.9; and
wherein the thermoplastic composition exhibits
 a UL 94 Vertical Burning Flame Test rating of V-0 or V-1 at a sample thickness of 6.4 millimeters,
 a tensile stress at break of 12 to 21 megapascals, measured at 23° C. according to ASTM D638, and
 a flexural modulus of 50 to 310 megapascals, measured at 23° C. according to ASTM D790.

15. The thermoplastic composition of claim 1,
wherein the thermoplastic composition comprises 3 to 25 weight percent of the flame retardant composition;
wherein the flame retardant composition comprises 1 to 15 weight percent of the metal dialkyl phosphinate;
wherein the flame retardant composition further comprises 1 to 20 weight percent of a nitrogen-containing flame retardant selected from the group consisting of melamine phosphate, melamine pyrophosphate, melamine polyphosphates, and mixtures thereof;
wherein the poly(arylene ether) and total polyolefin are present in a weight ratio of 0.56:1 to 1.2:1; and
wherein the nitrogen-containing flame retardant and the metal dialkyl phosphinate are present in a ratio of 0.2:1 to 5:1.

16. The thermoplastic composition of claim 15, wherein the flame retardant composition excludes triaryl phosphates that are liquids at one atmosphere and at least one temperature in the range 25 to 50° C.

17. The thermoplastic composition of claim 16, wherein the test sample coated wire exhibits
 a tensile stress at break of 10 to 30 megapascals, measured at 23° C. according to UL1581, Section 470, and
 a tensile elongation at break of 100 to 350 percent, measured at 23° C. according to UL1581, Section 470.

18. The thermoplastic composition of claim 16, wherein the test sample coated wire further exhibits a heat deformation of 5 to 50 percent, measured at 121° C. and a 250 gram load according to UL 1580.

19. The thermoplastic composition of claim 16, wherein the flame retardant composition consists of the metal dialkyl phosphinate and the nitrogen-containing flame retardant.

20. The thermoplastic composition of claim 16, wherein the flame retardant composition further comprises 0.05 to 2.5 weight percent zinc borate.

21. The thermoplastic composition of claim 16, further comprising 3 to 20 weight percent of total poly(alkenyl aromatic); wherein total poly(alkenyl aromatic) consists of poly(alkenyl aromatic)s and the poly(alkenyl aromatic) content of block copolymers comprising a poly(alkenyl aromatic) block and a polyolefin block.

22. The thermoplastic composition of claim 16,
wherein the thermoplastic composition comprises 37 to 47 weight percent of the poly(arylene ether);
wherein the poly(arylene ether) is a poly(2,6-dimethyl-1,4-phenylene ether) having an intrinsic viscosity of 0.3 to 0.6 deciliter per gram measured in chloroform at 25° C.;
wherein the thermoplastic composition comprises 34 to 43 weight percent of total polyolefin weight percent of total polyolefin;
wherein the total polyolefin comprises polypropylene, polybutene, ethylene-propylene copolymer, a poly(ethylene-co-propylene) block of a block copolymer comprising a polystyrene block and a poly(ethylene-co-propylene) block, and a poly(ethylene-co-butylene) block of a block copolymer comprising a polystyrene block and a poly(ethylene-co-butylene) block;
wherein the thermoplastic composition comprises 4 to 12 weight percent of the flame retardant composition consisting of
 2 to 6 weight percent of aluminum tris(diethyl phosphinate), and
 2 to 6 weight percent of melamine polyphosphate;
wherein the poly(arylene ether) and total polyolefin are present in a weight ratio of 0.8 to 1.2; and
wherein the test sample coated wire exhibits
 a tensile stress at break of 10 to 25 megapascals, measured at 23° C. according to UL1581, Section 470, and
 a tensile elongation at break of 200 to 300 percent, measured at 23° C. according to UL1581, Section 470.

23. The thermoplastic composition of claim 16,
wherein the thermoplastic composition comprises 6 to 25 weight percent of the flame retardant composition;
wherein the poly(arylene ether) and total polyolefin are present in a weight ratio of 0.68:1 to 1.2:1;
wherein the metal dialkyl phosphinate and the nitrogen-containing flame retardant are present in a weight ratio of at least 5:1; and
wherein the thermoplastic composition exhibits
 a UL 94 Vertical Burning Flame Test rating of V-0 or V-1 at a sample thickness less than or equal to 6.4 millimeters,
 a tensile stress at break of at least 5 megapascals measured at 23° C. according to ASTM D638, and
 a flexural modulus of 10 to 1,000 megapascals measured at 23° C. according to ASTM D790.

24. The thermoplastic composition of claim 1,
wherein the flame retardant composition further comprises a triaryl phosphate that is a liquid at one atmosphere and at least one temperature in the range 25 to 50° C.; and
wherein the poly(arylene ether) and total polyolefin are present in a weight ratio of 0.55:1 to 1.2:1.

25. The thermoplastic composition of claim 24, wherein the flame retardant composition excludes melamine phosphate, melamine pyrophosphate, and melamine polyphosphate.

26. The thermoplastic composition of claim 25, wherein the test sample coated wire exhibits
 a tensile stress at break of 10 to 25 megapascals, measured at 23° C. according to UL1581, Section 470, and
 a tensile elongation at break of 100 to 360 percent, measured at 23° C. according to UL1581, Section 470.

27. The thermoplastic composition of claim 25, wherein the test sample coated wire further exhibits a heat deformation of 5 to 20 percent, measured at 121° C. and a 250 gram load according to UL 1580.

28. The thermoplastic composition of claim 25, further comprising 3 to 20 weight percent of total poly(alkenyl aromatic); wherein total poly(alkenyl aromatic) consists of poly (alkenyl aromatic)s and the poly(alkenyl aromatic) content of block copolymers comprising a poly(alkenyl aromatic) block and a polyolefin block.

29. The thermoplastic composition of claim 25,
  wherein the thermoplastic composition comprises 39 to 47 weight percent of the poly(arylene ether);
  wherein the poly(arylene ether) is a poly(2,6-dimethyl-1, 4-phenylene ether) having an intrinsic viscosity of 0.3 to 0.6 deciliter per gram measured in chloroform at 25° C.;
  wherein the thermoplastic composition comprises 35 to 42 weight percent of total polyolefin weight percent of total polyolefin;
  wherein the total polyolefin comprises polypropylene, polybutene, ethylene-propylene copolymer, a poly(ethylene-co-propylene) block of a block copolymer comprising a polystyrene block and a poly(ethylene-co-propylene) block, and a poly(ethylene-co-butylene) block of a block copolymer comprising a polystyrene block and a poly(ethylene-co-butylene) block;
  wherein the thermoplastic composition comprises 4 to 10 weight percent of the flame retardant composition consisting of aluminum tris(diethyl phosphinate);
  wherein the poly(arylene ether) and total polyolefin are present in a weight ratio of 0.9 to 1.2; and
  wherein the test sample coated wire exhibits
    a tensile stress at break of 10 to 25 megapascals, measured at 23° C. according to UL1581, Section 470, and
    a tensile elongation at break of 150 to 300 percent, measured at 23° C. according to UL1581, Section 470.

30. The thermoplastic composition of claim 1, wherein the flame retardant composition consists of the metal dialkyl phosphinate.

31. An extruded article, comprising the product of extrusion molding the thermoplastic composition of claim 1.

32. A coated wire, comprising:
  a conductor, and
  a covering disposed on the conductor;
  wherein the covering comprises the thermoplastic composition of any of claim 1.

* * * * *